(12) United States Patent
Nesbitt

(10) Patent No.: US 7,455,878 B2
(45) Date of Patent: Nov. 25, 2008

(54) METHOD FOR SIMULTANEOUSLY COATING AND MEASURING PARTS

(75) Inventor: Bruce M. Nesbitt, Chicago, IL (US)

(73) Assignee: Dimension Bond Corporation, Chicago, IL (US)

(*) Notice: Subject to any disclaimer, the term of this patent is extended or adjusted under 35 U.S.C. 154(b) by 771 days.

(21) Appl. No.: 11/014,557

(22) Filed: Dec. 15, 2004

(65) Prior Publication Data

US 2005/0110198 A1 May 26, 2005

Related U.S. Application Data

(60) Division of application No. 10/447,249, filed on May 28, 2003, now Pat. No. 6,832,577, which is a continuation-in-part of application No. 10/190,980, filed on Jul. 8, 2002, now Pat. No. 6,860,947.

(51) Int. Cl.
*B05D 1/02* (2006.01)
*B05D 1/04* (2006.01)

(52) U.S. Cl. .................. 427/9; 427/8; 427/475; 427/427.2

(58) Field of Classification Search .............. 427/8–10, 427/457–486, 421.1–427.7; 118/665, 680, 118/356
See application file for complete search history.

(56) References Cited

U.S. PATENT DOCUMENTS

| | | |
|---|---|---|
| 2,048,912 A | 7/1936 | Ziska et al. |
| 3,645,581 A | 2/1972 | Lasch, Jr. et al. |
| 4,346,667 A | 8/1982 | Stamets et al. |
| 4,800,104 A | 1/1989 | Cruickshank |
| 4,895,102 A | 1/1990 | Kachel et al. |
| 4,957,526 A * | 9/1990 | Frazee et al. .................. 65/378 |
| 5,001,353 A | 3/1991 | Odake et al. |
| 5,138,972 A | 8/1992 | Glanzmann |

(Continued)

FOREIGN PATENT DOCUMENTS

JP 04077712 3/1992

OTHER PUBLICATIONS

Keyence, High-speed Laser Scan Micrometer, Cat. No. LS5-C (1999).

(Continued)

*Primary Examiner*—Frederick J Parker
(74) *Attorney, Agent, or Firm*—Bell, Boyd & Lloyd LLP

(57) ABSTRACT

An apparatus and method for simultaneously coating and measuring a part including a part support, a sprayer, a part measurer including a digital camera and a display device, all of which are positioned adjacent to the part support. The sprayer applies a coating to a section of the part while the part measurer continuously measures at least two dimensions of the section. The digital camera takes at least one picture of the entire section of the part while the part is being coated and enables a user to accurately determine the cross section of the part to the optimum finished part configuration and size and also detect defects, blemishes or coating irregularities formed on the section. The apparatus and method of the present invention significantly reduces the margin of error related to the application of coatings to parts, the number of defective parts and increases the overall efficiency.

27 Claims, 24 Drawing Sheets

U.S. PATENT DOCUMENTS

| | | | |
|---|---|---|---|
| 5,229,840 A | 7/1993 | Arnarson et al. | |
| 5,274,243 A | 12/1993 | Hochgraf | |
| 5,277,928 A | 1/1994 | Strandberg | |
| 5,366,757 A | 11/1994 | Lin | |
| 5,374,312 A | 12/1994 | Hasebe et al. | |
| 5,375,613 A | 12/1994 | Aindow et al. | |
| 5,429,682 A | 7/1995 | Harlow et al. | |
| 5,666,325 A | 9/1997 | Belser et al. | |
| 5,709,905 A | 1/1998 | Shaw et al. | |
| 5,757,498 A | 5/1998 | Klein, II et al. | |
| 5,759,615 A | 6/1998 | Lasley et al. | |
| 5,871,805 A | 2/1999 | Lemelson | |
| 5,902,399 A | 5/1999 | Courtenay | |
| 5,959,731 A * | 9/1999 | Jones | 356/503 |
| 6,169,605 B1 | 1/2001 | Penn et al. | |
| 6,236,459 B1 * | 5/2001 | Negahdaripour et al. | 356/496 |
| 6,270,579 B1 | 8/2001 | Subramanian et al. | |
| 6,279,226 B1 | 8/2001 | Ohkubo et al. | |
| 6,376,013 B1 | 4/2002 | Rangarajan et al. | |
| 6,388,754 B1 | 5/2002 | Nishikawa et al. | |
| 6,421,929 B1 | 7/2002 | Keefe | |
| 6,423,371 B1 | 7/2002 | Nesbitt | |
| 6,459,951 B1 | 10/2002 | Griffith et al. | |
| 6,496,222 B1 | 12/2002 | Roberts et al. | |
| 6,548,115 B1 | 4/2003 | Gibson et al. | |
| 6,549,291 B1 | 4/2003 | Dieter et al. | |
| 6,667,070 B1 | 12/2003 | Adem | |
| 6,699,324 B1 | 3/2004 | Berdin et al. | |
| 2003/0161946 A1 | 8/2003 | Moore et al. | |
| 2004/0003776 A1 | 1/2004 | Nesbitt | |
| 2004/0005402 A1 | 1/2004 | Nesbitt | |

OTHER PUBLICATIONS

NN75022703, Article Transfer/ Cleaning/ Inspection Station, Feb. 1975, IBM Technical Disclosure Bulletin, Disclosure Text and Figure (cited by Examiner in co-pending U.S. Appl. No. 11/301,489).

* cited by examiner

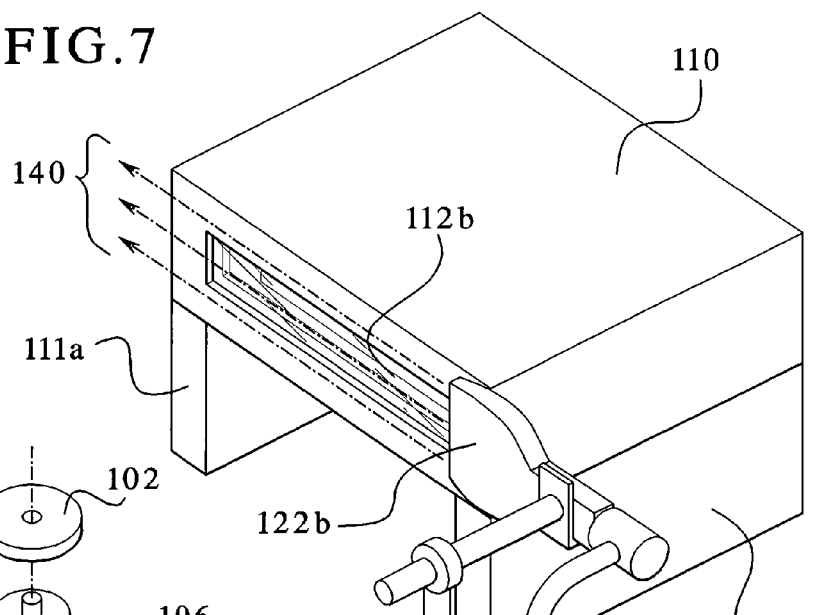
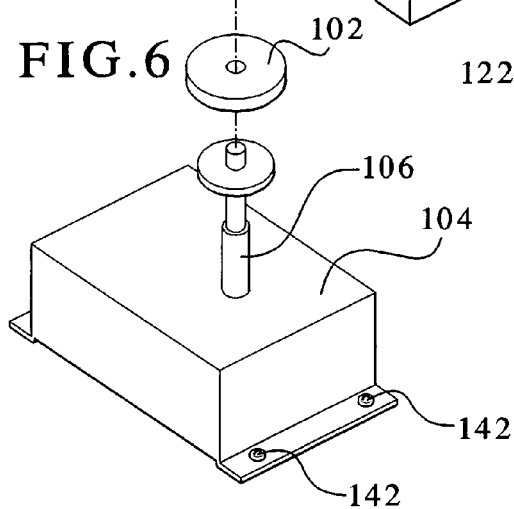
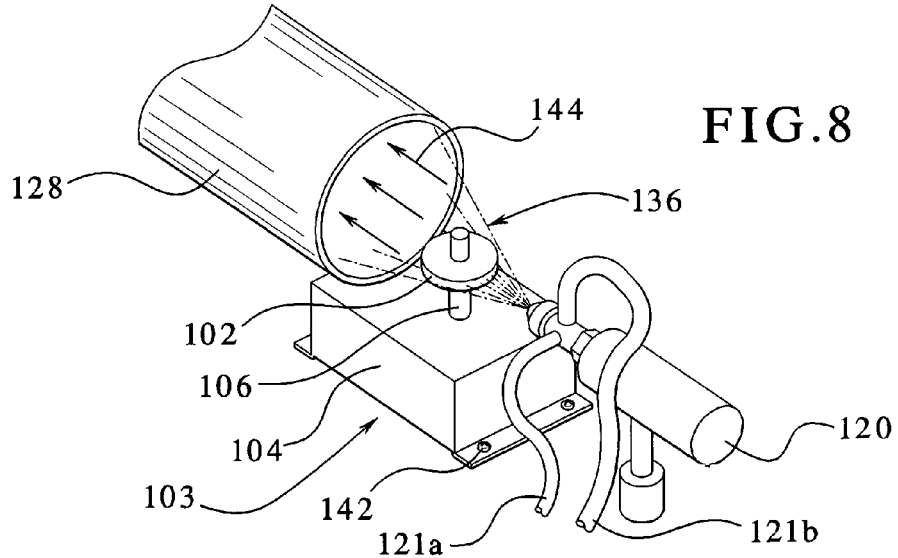
FIG.7
FIG.6
FIG.8

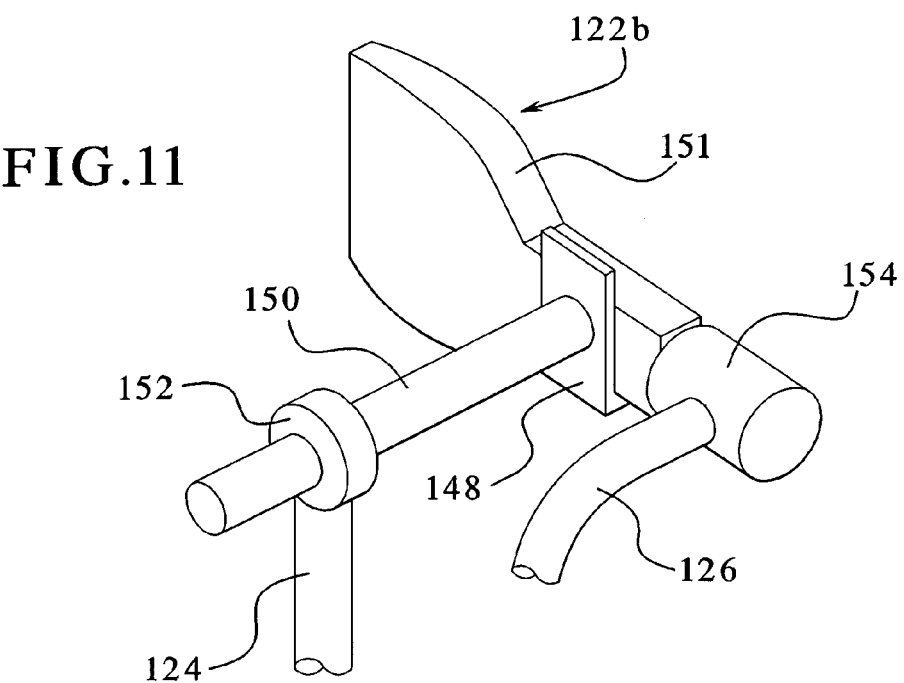
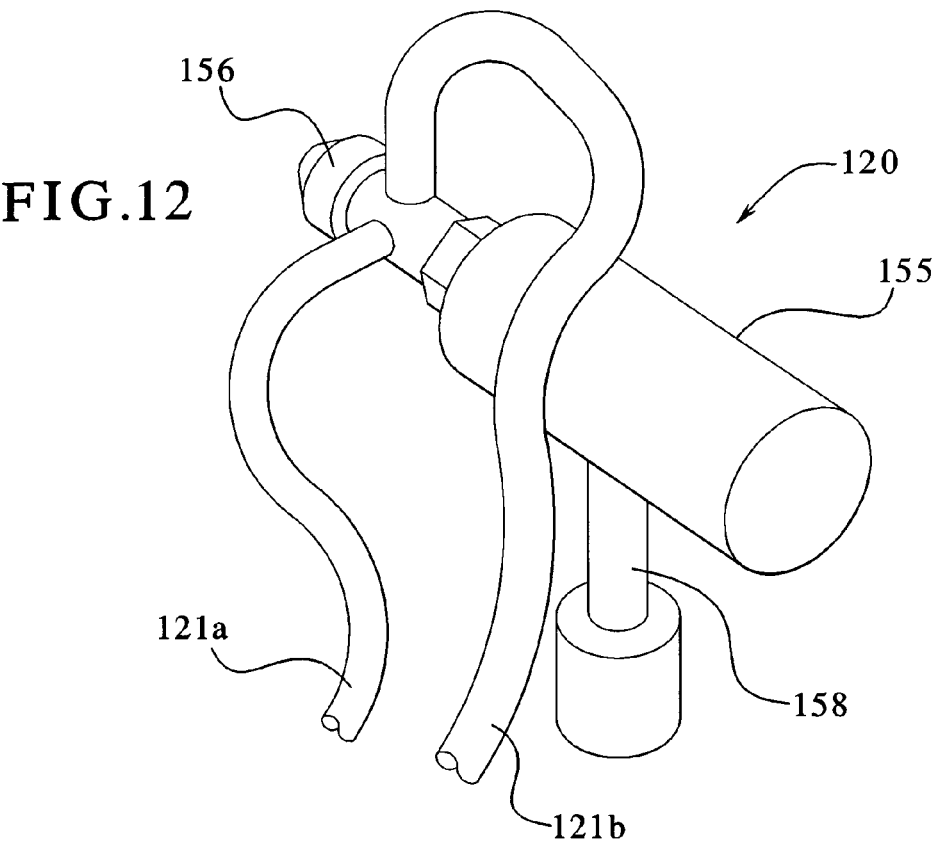

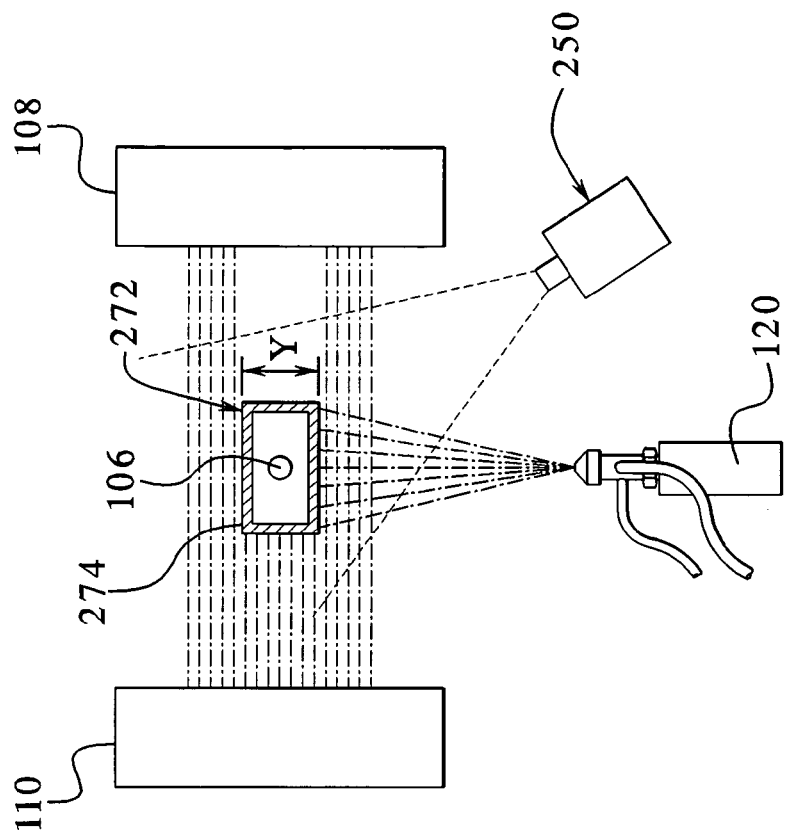
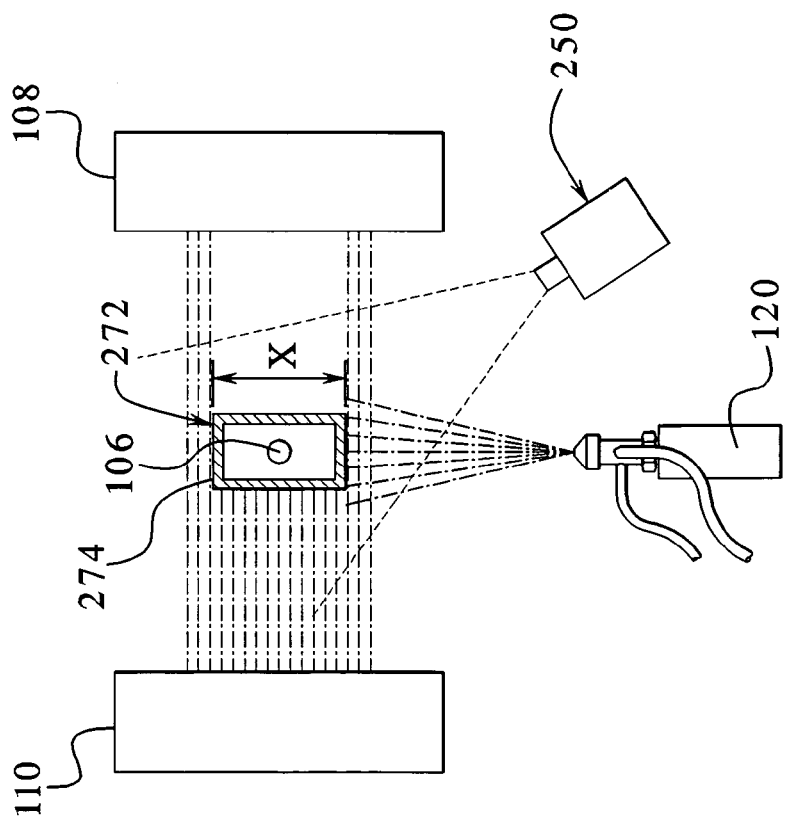

METHOD FOR SIMULTANEOUSLY COATING AND MEASURING PARTS

This application is a divisional application of, claims priority to and the benefit of U.S. patent application Ser. No. 10/447,249, filed May 28, 2003, now U.S. Pat. No. 6,832,577 which is a continuation-in-part of, claims priority to and the benefit of U.S. patent application Ser. No. 10/190,980, filed Jul. 8, 2002, now U.S. Pat. No. 6,860,947 the entire contents of which are incorporated herein.

CROSS REFERENCE TO RELATED APPLICATIONS

This application relates to the following commonly owned patent applications: "Method for Simultaneously Coating and Measuring Parts," Ser. No. 10/190,982, now U.S. Pat. No. 6,998,147; "Apparatus for Simultaneously Coating and Measuring Parts," Ser. No. 10/190,980, now U.S. Pat. No. 6,860,947 B1; "Apparatus For Simultaneously Coating And Measuring Parts," Ser. No. 10/810,179, now U.S. Pat. No. 6,997,992; "Apparatus For Simultaneously Coating And Measuring Parts," Ser. No. 10/828,694, now U.S. Pat. No. 6,991,683; "Apparatus And Method For Simultaneously Coating And Measuring Parts," Ser. No. 11/014,558, "Method for Simultaneously Coating and Measuring Parts," Ser. No. 11/288,875, "Method for Simultaneously Coating and Measuring Parts," Ser. No. 11/270,205, and "Apparatus for Simultaneously Coating and Measuring Parts," Ser. No. 11/301,489 now U.S. Pat. No. 7,396,414.

BACKGROUND OF THE INVENTION

The present invention relates in general to a coating apparatus and specifically, to an apparatus and method for simultaneously coating and measuring a part, and simultaneously coating the part based on the desired dimension of the part, desired coating thickness or both the desired dimension and coating thickness.

Several different types of parts that rub, slide rotate or otherwise move are manufactured and assembled for various industries. The parts are used on different types of products, devices, equipment and machines. The characteristics of the parts vary based on the particular use for the parts. Some parts used in certain products, devices, equipment and machines are often subject to stress such as wear and heat. Eventually, certain parts break or become ineffective after continuous and repeated use.

One method commonly used to increase the durability of the parts subject to various types of stresses during operation is to apply protective coatings to the parts. Some coatings protect parts against friction or wear so that the parts are more durable and last longer in operation. Other coatings enhance the aesthetic appearance or corrosion resistance of the parts. Coatings may be applied to the entire part or only applied to a particular wall, portion or section of the part. The particular coating, and application of the coating, depends in part on the part and the coating process requested or desired by the manufacturer of the part, purchaser of the part or user of the part.

Known coating apparatus coat several different types of parts including machined, threaded, fabricated, molded and die-cast parts. Such parts are typically manually placed on a part holder or support and then sprayed with a coating. The part may be moved as necessary to coat the part or the particular portions of the part. The vast majority of parts have dimensional tolerances or tolerance levels, and design specifications that limit the size (including all dimensions) of the part and the amount of coating, such as the maximum and minimum amount of the coating that may be applied to the part or any section, portion or dimension of the part. The maximum and minimum coating thicknesses for a part or parts are determined based on mechanical, dimensional and/or corrosion requirements and other similar quality or design parameters. The dimensional tolerances and design specifications are determined from detailed calculations based on the particular machine, equipment, product, device or industrial operation that the part will be used in. Therefore, the part must be measured to ensure that the part falls within and does not exceed the particular dimension tolerances and/or maximum and minimum coating thicknesses specified for the part so the part will fit to allow assembly of the part and function for the design and/or warranty life of the unit or assembly.

In one known process, non-coated parts are initially measured to determine if they are within an acceptable dimensional range. Some non-coated parts are too large and cannot be coated because the coating will make the parts larger than the upper dimensional limit of the parts, and unfit for use. Other non-coated parts are too small and cannot be coated because too much coating would have to be applied to the parts in order to meet the predetermined dimensional tolerances. Such excessive coating on a part may become weak and may be prone to breaking or causing the part to fail during operation. Such unusable parts are usually discarded or recycled. The non-coated parts that are within an acceptable dimensional range for coating are individually placed on a part support and sprayed or coated by a sprayer. The sprayer sprays or coats the part with an amount of coating determined according to a particular procedure that is calculated, and often estimated, by the operator or processor so that a reasonably sufficient amount of coating is applied to the part to make the part within dimensional tolerances. In certain known coating systems, the amount of coating is not determined for each part, but rather for a group or lot of parts. Therefore, the amount of coating applied to each part may or may not be based on the exact measurement of such part as the wet or dry coating to be applied to the parts cannot be measured with mechanical contact-type measuring devices. Even if a mechanical contact-type measuring device were used to measure the coated part or parts, the applied coating on the part would be blemished or altered due to the contact of the measuring device on the coating which renders the part or parts unusable.

In other known coating systems, prior to coating the part, the part is measured to determine if it is within acceptable dimensional ranges established for the part. If the part is within the acceptable dimension range, the amount of coating needed to coat the part to achieve the final product size is calculated and then applied to the part. After the coating is applied, the part is measured to ensure that the coated part is still within the dimensional tolerance limits and design specifications for the part. If the coated part is not within the dimensional tolerance limits and/or the design specifications for the part, the part is unusable and either the coating is removed and subsequently re-applied or the part is discarded. If the part falls within the tolerance limits and design specifications for the part, the part is removed from the part support and transported to the manufacturer, purchaser or user of the part.

One known problem with such known coating processes is that the coating that is applied to the part is applied without any measurements taken while the part is being coated. After completion of the coating process, the coated part is measured to determine if it is within established dimensional tolerance levels and design specifications. If the coated part is not within the established tolerance levels and design specifications, the part cannot be used for its intended purpose. If the part is too large or too big, the part dimension cannot be reduced in order to meet the desired design specifications. Similarly, if the part is too small after applying the coating, additional coating cannot be applied because the original coating has been dried or oven cured and additional layers of coating would diminish the strength and durability of the part due to poor adhesion between the coating layers. Specifically, when low friction coatings such as Teflon® are used to coat a surface of a part and the coated surface is cured, the coated surface cannot be re-coated if the measured dimension of the part is too small. As a result, the coating on the part must be completely removed before the part can be re-coated or the part must be discarded. However, even if more coating could be added to the part, this essentially doubles the amount of time spent to produce a dimensionally acceptable part.

Therefore, a significant margin of error is introduced into or present in the known coating processes based on the calculation of the amount of coating to be applied to achieve the final product. The known coating processes calculate the total amount of coating needed to achieve the final part size only at the beginning of the coating process and in certain systems based on measurements taken of a group or lot of parts instead of individually on the part to be coated. In such case, all of the calculated amount of coating is applied to the part. Applying a large amount of coating to the part is less accurate than applying a smaller amount of coating because the margin of error is greater. As a result, some or all of the parts in a lot or batch of parts are unusable because the coated part or parts are outside of the acceptable dimensional tolerance levels for the part or parts.

Accordingly, there is a need for a coating apparatus and method that accurately measures a part size and/or the maximum and minimum coating thicknesses of a part while coating the part so that the part is coated with greater accuracy, consistency and efficiency, to provide complete usability of an entire lot or batch of parts. Additionally, there is a need for a coating apparatus and method that accepts varying uncoated part sizes and selectively applies a proportional amount of coating to the uncoated parts to generate coated parts, which have a final coated size within the desired design specifications for the parts.

SUMMARY OF THE INVENTION

The present invention provides a coating apparatus and method and more specifically a coating apparatus and method which measures a part, applies a coating to the part based on such measurement and continuously measures the part during the coating process.

One embodiment of the coating apparatus and method of the present invention includes a frame, a part support positioned adjacent to the frame, a sprayer connected to the frame and positioned adjacent to the part support, a part measurer connected to the frame and positioned adjacent to the part support, a processor that receives the measurements recorded by the part measurer and calculates the particular dimension of the part before and as the part is being coated by the sprayer and a display device that displays the part dimension or size to an operator before, after and during the coating process. In one embodiment, the coating method of the present invention applies an initial amount of coating and then a final amount of coating to the part. Applying the coating in two steps and in one embodiment applying a smaller final amount of coating, reduces the margin of error associated with the coating process which increases the accuracy of the coating process.

In one embodiment, the part support receives and holds the part during the measuring and coating process and rotates or otherwise moves the part as needed to ensure that the part or the portion or section of the part to be coated is sufficiently and equally coated by the sprayer. The part support is mounted on a housing which encloses a motor. The motor is mounted in the housing and causes the part support to rotate or otherwise move. The motor housing is secured to the frame to maintain the position of the part during the coating process. In another embodiment, the part support includes a conveyor which is positioned adjacent to the frame and adapted to hold and transport a plurality of parts. The conveyor transports each part to a position in front of the sprayer to be coated by the sprayer. The conveyor then transports the parts to other processes which makes the coating process fully automated.

In one presently preferred embodiment, the part measurer is secured to the frame and includes a laser generator and a laser receiver. In one embodiment, the laser generator is a laser scan micrometer. However, the laser generator may be any suitable laser generator. The laser generator generates a continuous laser beam which includes a plurality of rays which are projected onto the part and specifically on the dimension of the part to be coated. In one preferred embodiment, the laser generator and laser receiver are each mounted in protective housings. Each housing preferably includes a transparent removable section or member which enables the laser beam to pass through the section while protecting the laser generator and laser receiver from overspray. Certain portions of the laser beam or certain rays of the laser beam pass by the part and are received by the laser receiver. Other portions of the beam or certain rays are blocked by the part and are not received by the laser receiver. The laser receiver generates electrical signals based on the received portions of the laser beam. The signals are communicated to the processor which calculates the measurement of the dimension the part based on which rays are blocked and which rays are received by the laser receiver. The measurement data is communicated to the display device and displayed to an operator. In one embodiment, the operator may choose the type of information that is displayed on the display screen of the display device, such as the upper and lower dimension tolerance levels for the part.

In one embodiment, a plurality of part measurers including at least one laser generator and at least one laser receiver are positioned adjacent to the part on the part support. In this embodiment, each part measurer or each laser generator and corresponding laser receiver projects a laser beam and measures a different section of the part being coated by the sprayer. In another embodiment, the laser generators and corresponding laser receivers project laser beams and measure different coatings applied to a section or sections being coated on a part. For example, a first laser generator and a first laser receiver projects a laser beam and measures a base coating applied to a section of a part and a second laser generator and a second laser receiver projects a laser beam and measures a top coating or final coating applied to the same section of the part.

In one presently preferred embodiment, an exhaust duct is positioned on the side of the part support opposite the sprayer. The exhaust duct generates a vacuum or suctioning affect, which suctions and captures excessive spray or overspray generated by the sprayer which is not applied to the part. The exhaust duct may be any suitable type of exhaust duct.

In one presently preferred embodiment, the coating apparatus includes air movers positioned adjacent to the housings for the laser generator and the laser receiver to direct air across the transparent sections of the housing. This minimizes the amount of overspray from the sprayer that accumulates on the surfaces of the transparent sections of the housings of the laser generator and the laser receiver. Such accumulated coatings would eventually obstruct the laser beam generated by the laser generator and affect the measurement of the parts. In one preferred embodiment, the protective transparent members, plates or panels such as glass plates are slideably connected to the housings of the laser generator and the laser receiver. In another embodiment, the glass plates are removably connected to the housings using suitable adjustable and/or removable connectors or fasteners. It should be appreciated that the glass plates may be connected to the housings using any suitable connectors or connecting methods. It should also be appreciated that the air movers may alternatively suction or blow air to remove the excess coating from the vicinity of the glass plates.

In another embodiment, the sprayer applies a coating or coatings to a section of a part using a pulsing spray to prevent the coating or coatings from obstructing the laser beam emitted by the laser generator. Preventing the coating from obstructing or interfering with the laser, further enhances the accuracy of the dimension measurements taken by the part measurer. In this embodiment, the processor or computer controls the sprayer and causes the sprayer to generate the pulsing spray by activating the sprayer or turning the sprayer on for a designated time interval and then de-activating the sprayer or turning the sprayer off for a designated time interval. The processor also controls the laser generator and causes the laser generator to emit a laser beam when the sprayer is deactivated and deactivates the laser generator when the sprayer is activated. The alternate sequencing of the operation of the sprayer and the laser generator continues until the coating applied to the section of the part achieves a designated or desired thickness.

In an alternative embodiment, the sprayer applies a coating to a section of a part by using the pulsing spray method described above while the laser generator remains activated or continuously emits a laser towards the part. In this embodiment, the laser generator remains activated and takes measurements of the section of the part being coated when the sprayer is not coating the section of the part. Thus, the sprayer and laser generator alternately, sequentially apply the coating and take measurements of the section of the part. This sequence continues until the coating applied to the section of the part achieves a designated or desired coating thickness or dimension measurement for the section of the part.

In a further embodiment, a transparent protective device such as a roll of a protective material such as a suitable clear or transparent film or ribbon is attached adjacent to the front of each of the housings of the laser generator and the laser receiver to protect the laser generator and laser receiver and prevent the build up of coating on the front of the housings. The transparent film may be made using any suitable material such as a suitable plastic material which has a sufficient and suitable width and thickness. The transparent film advances or indexes from a protective material provider or film provider such as a first roller on one side of the front of the housing to a protective material receiver or film receiver such as a second roller on the other side of the housing. In one aspect of this embodiment, the second roller is rotatably connected to a suitable actuator such as a motor which is in communication with a processor. The processor causes the motor to rotate the second roller and advance or index the transparent film in intervals to provide a continual clear, clean and protective surface or window in front of each of the housings. It should be appreciated that other mechanisms may be employed in accordance with the present invention to provide a transparent protective material for the laser generator and the laser receiver.

One embodiment of the method of the present invention generally includes the steps described below. The part is initially measured to determine if the part is within a particular range of acceptable dimensions or sizes for the parts. To take the measurement, the laser generator generates a laser beam which is directed at the part. The laser receiver receives the unblocked portions of the laser beam and converts this information into electrical signals. The electrical signals are communicated to the processor, which calculates the dimension or size measurement of the part and/or the coating thickness of the coating on the part. If the part it unacceptable (i.e., the part size or coating thickness is not within an acceptable range) a prompt is provided to the user and the part is removed and discarded or recycled as necessary. If the part size and/or coating thickness is within an acceptable range, the measurement is communicated to the display device, which displays the measurement information to the operator. In a fully automated embodiment, the measurement is communicated to a robot (i.e., processor) or other processor, which controls the operation of the apparatus. In the semi-automated embodiment described above, the operator presses or activates an input such as a start button or pedal to initiate the coating process. After the input is activated, the processor turns the sprayer on and begins to coat the part. Once the part achieves the desired size, dimension and/or coating thickness for the part, the sprayer is shut off and the coated part is transported to another manufacturing area for further processing.

The coating may be applied in one or more steps using one or more spray guns to apply the coating or coatings to the part. In one presently preferred embodiment of the present invention, the coating is applied to the part in two steps with two sprayers. First, an identical, initial amount of coating is calculated and applied to each part. This initial coating may be the same coating or a different coating than the subsequently applied coating or coatings. The initial amount of coating is preferably greater than half of the total amount of coating to be applied to each part. In one embodiment, a significant percentage of the total coating such as approximately ninety-five percent of the total coating is first applied to each part. Each part is then re-measured with the laser device and a final amount of coating is calculated and applied to the parts. The final amount of coating is a smaller amount and therefore, the margin of error in calculating the amount of coating to be applied is significantly smaller and the total processing time of the parts is significantly reduced. By coating each part in two sequential coating steps, the present invention significantly reduces the margin of error or deviation between the final part size and the desired part size and increases production.

In another embodiment, the coating is applied to the part based on the desired dimension for the part. In this embodiment, the sprayer applies a coating to the part while the part measurer measures the dimension of the part being coated. The sprayer continues to apply the coating to the part until a predetermined dimension is achieved for the part. At this point, a final amount of coating is calculated and applied to the part as described above. The sprayer applies the final amount of coating to the part while the part measurer measures the part until the desired dimension is achieved.

In a further embodiment, the sprayer applies the coating to the part while the part measurer measures the part until the final desired dimension is achieved for the part. Therefore, the coating is applied to the part until the part measurer measures the desired final dimension for the part.

In another embodiment, the coating is applied based on the desired thickness of a coating applied to the part. The coating is applied to the part while the part measurer measures the thickness of the coating that is added to the part. When a desired coating thickness is achieved, the sprayer shuts off and the part is transported for further processing.

In a further embodiment, one or more coatings are applied to a part using a plurality of sprayers or spray guns in sequential steps. Each sprayer may apply the same coating, different coatings or any combination of coatings to the section or sections of the part. In one example of this embodiment, three sprayers are directed at a section of a part to be coated and the sprayers apply a base coating or primer, a middle coating or midcoat and a final coating or topcoat to the section of the part. The coatings are applied to the part separately while the part measurer simultaneously measures the thickness of each of the coatings as the coatings are applied to the part. The processor receives the coating thickness measurements for each of the coatings from the part measurer and controls the sprayers to apply a predetermined amount of each of the coatings to the part.

In one embodiment, the coating apparatus measures and coats only one portion of a part such as the outer surface of the part. In another embodiment, the part support moves the part in different directions such as upwards and downwards, so that more than one portion of a part can be measured and coated. In this embodiment, a shield may be employed to protect the other sections of the part from being coated.

In one embodiment of the present invention, the part is manually placed and removed from the part support in the coating apparatus and method of the present invention. In another embodiment, the part is placed on a part support which includes a conveyer which transports the part. In a further embodiment, the part is mechanically placed and removed from the part support such as by a robotic arm or similar device in the coating apparatus of the present invention. The present apparatus and method significantly enhances the productivity and production rates for manufacturing lines that coat parts because less time is needed to manually move and measure the parts.

In an alternative embodiment, the part measurer further includes a digital camera positioned adjacent to the part support. In this embodiment, the digital camera includes a digital motion picture camera, a digital television camera or a DVT camera. In another embodiment, the term digital camera is meant to include an analog camera in conjunction with a digital converter, which converts the analog picture or pictures taken by an analog camera to digital pictures. In one embodiment, the digital camera takes a plurality of sequential digital pictures of the entire part as one of the sections or surfaces of the part is being coated by the sprayer. Each of the pictures includes a plurality of pixels or picture elements. The sequential digital pictures (i.e., the pixels) are transferred or transmitted from the digital camera to a processor such as a central processing unit in a computer. In one embodiment, a display device such as a computer monitor displays the digital motion picture of the part as it is being coated by the sprayer. Additionally, the processor calculates the dimension measurements of the entire section of the part being coated based on the sequential digital pictures taken by the digital camera and displays these measurements on the display device. Using the calculated dimension measurements of the entire section being coated, the apparatus coats the section of the part with greater accuracy. Additionally, the DVT type part measurer detects defects or irregularities such as angles, tapers, coating drips or lumps, and any other irregular type of surface formed on the section of the part being coated with greater accuracy.

In one embodiment, the part measurer includes a laser generator, a laser receiver and a digital camera. The laser generator, laser receiver and the digital camera simultaneously measure at least two different planes of a dimension of the section of the part being coated while the section is coated by the sprayer. In one embodiment, prior to coating the part, the laser generator and the laser receiver measures one plane of a dimension of the section of the uncoated or raw part. Additionally, the takes a digital motion picture, digital picture or DVT picture of the entire part, which enables the processor to calculate at least one other or additional dimension of the section of the part. Therefore, the part measurer measures at least two planes of the dimension of the section of the part to determine if the uncoated or raw part is within a range of acceptable dimensions. When at least one of the dimensions calculated from the measurements of the uncoated part is not within or outside the range of acceptable dimensions for the section, the part is not coated and subsequently discarded. It should be appreciated that the acceptable dimension or range of dimensions for a section of a part being coated may be inputted by a user by entering the desired dimension or dimensions of the section of the part being coated using a suitable input device such as a keyboard. The processor processes the dimension data for the section and stores this information in a suitable memory device. The user also enters in the acceptable dimension tolerances or variances for the coated section of the part.

As the section of the part is being coated, the laser generator, laser receiver and the digital camera measure at least two planes of a dimension of the section of the part being coated. The measurements are transferred to the processor, which calculates the dimensions of the section of the part while its being coated. The calculated dimensions are compared to the desired dimension or dimensions for the section of the part being coated to determine whether the coated part is near or within acceptable dimension specifications and variances for the section.

The digital camera supplements the measurement taken by the laser generator and laser receiver by measuring at least one additional or other plane of the dimension of the part being coated. Because the digital camera takes at least one picture of the entire section of the part, the digital camera provides measurements for at least one additional plane or plurality of planes of the section of the part. Thus, the digital camera measures the entire section of the part (i.e., from the top of the section to the bottom of the section) and thereby measures the portions of the section that are not measured or difficult to measure with the laser generator and laser receiver. The digital camera therefore measures and detects defects or irregularities formed on the surface of the part (i.e., bumps, coating build up, tapers or drips) during the coating process, which may not be measured and detected by the laser generator and laser receiver. The coating operation can then be adjusted or stopped as necessary to correct or prevent the defective areas of the section of the part or the defective part or parts. Thus, the part measurer of this embodiment, significantly improves the coating accuracy and efficiency of the coating apparatus by measuring each plane of the surface of section of the part being coated and also by preventing defects from forming on the section during the coating process.

Additionally, the part measurer including at least one digital camera enables the coating apparatus of the present invention to measure and coat parts including irregular shaped surfaces such angled surfaces, beveled surfaces, round surfaces, tapered surfaces, convex surfaces, concave surfaces or other irregular surfaces. The digital camera takes a plurality of sequential digital pictures of the entire section of the part being coated and the processor calculates a dimension associated with each plane of the section of the part based on the pictures. By measuring the entire section of the part, the coating apparatus can accurately measure and coat angled or irregular surfaces on a section of a part that are not in the plane of the laser generated by the laser generator. Therefore, the digital camera expands the planes of the section of the part that can be measured by the part measurer, and thereby prevents the sprayer from applying excess coating to surfaces or an incorrect amount of coating on the section of the part such as angled surfaces, which are not measured by the laser generator and laser receiver.

In another alternative embodiment, the part measurer further includes a plurality of digital cameras. In one aspect of this embodiment, the digital cameras take digital pictures of the same dimension of a section being coated. In another aspect, at least two digital cameras take digital pictures of different dimensions of a section being coated. In a further aspect, at least two digital cameras take digital pictures of dimensions of different sections on the part being coated.

In a further alternative embodiment, the part measurer includes at least one digital camera, but does not include a laser generator and a laser receiver. In this embodiment, the digital camera is positioned adjacent to the part support and is directed at the position of the part being coated. The digital cameras measure different planes of a dimension of a section of a part. The digital camera may also be used to measure the dimension of different sections of the part.

In a further alternative embodiment of the present invention, the part measurer measures and coats parts that are not round. In this embodiment, the sprayer and the part measurer simultaneously measure and coat a section of the part by measuring two axes or a first and second dimension of the section of the part. For example, in the embodiment described above, the part measurer includes a laser generator, a laser receiver and a digital camera. The laser generator, the laser receiver and the digital camera measure the dimensions of a section of the part being coated. While the part is rotated and coated, the part measurer measures a first dimension of the section of the part such as the length. The part measurer then measures a second dimension of the section such as the width. The two dimensions (i.e., the length and width) are calculated during the coating process and enable the sprayer to accurately coat the section of the non-round part.

In another embodiment, the part measurer is employed in a powder coating process or powder spray process. In the powder spray process, the powder coating includes very fine particles which are applied to the section of the part being coated. In one embodiment, a charge such as a positive charge is generated in the entire part or the section of the part being coated using electricity from a conventional electrical outlet or other suitable electrical source. The part or the section of the part includes an opposite charge to that of the powder coating. The oppositely charged part or part surface attracts the fine particles of the powder coating to the part. The resultant coated part includes an even and uniform coating, which strongly adheres to the surface of the part. In one embodiment, the powder coated part is cured using a suitable curing device or curing process, which shrinks the powder coating onto the part being coated or the section of the part being coated. In one embodiment, a single powder coating layer is applied to the part or the section of the part being coated using the powder coating system or process described above. In another embodiment, two powder coating layers are applied to the part or the section of the part being coated.

In a further embodiment, a liquid coating layer such as a primer coating is applied to the part initially and then the powder coating is applied to the primer coating on the part. The powder coating adheres to the liquid coating or primer coating to produce the final coated part. In another embodiment, one or more topcoats or final coating layers are applied to the powder coating on the section of the part being coated. It should be appreciated that the part measurer of the present invention may be employed in a coating system that applies powder coatings, liquid coatings or any suitable combination of powder coatings and liquid coatings to a part or section of a part.

In another embodiment, the part measurer is employed in an electrostatic powder spray system which utilizes one or more electrostatic spray guns to apply a powder coating to a part or a section of the part being coated. In this embodiment, a bonding material, bonding coating or primer and then a conductive material or conductive coating is applied to the section of the part being coated. The powder or powder coating includes a charge such as a positive charge and the conductive material includes an opposite charge such as a negative charge. The conductive coating attracts the oppositely charged powder coating to the conductive material or coating on the part or the section of the part. In one embodiment, the coated part is cured using a suitable curing device or curing process.

In a further embodiment, a coating system includes a plurality of coating stations, wherein each station includes at least one part measurer and at least one sprayer or coating applicator. In one embodiment, a suitable processor such as a computer having a monitor is used to communicate with the part measurers and sprayers at each station. In another embodiment, a computer and monitor are located at each station and communicate and control the operation of the part measurer or part measurers and the sprayer or sprayers at each station. The stations are preferably connected by conveyors or other suitable part transportation devices. In this embodiment, a part or a section of a part is coated at one or more of the stations while being measured at one or more of the stations. The conveyors transport the part to be coated to and from each of the stations. It should be appreciated that each station may include a sprayer or sprayers that apply a liquid coating, a powder coating, a plurality of liquid coatings, a plurality of powder coatings or any suitable combination of liquid and powder coatings to the part or section of the part being coated. In one embodiment, one or more of the stations include a curing oven, infrared oven or other suitable curing device or process, which cures one or more of the coatings applied to the part.

It is therefore an advantage of the present invention to provide an apparatus and method for coating a part that measures at least two dimensions of the section of the part being coated.

It is another advantage of the present invention to provide an apparatus and method that detects defects and/or irregularities generated during the coating and measuring of a part.

It is another advantage of the present invention to provide an apparatus and method that significantly enhances coating accuracy.

It is a further advantage of the present invention to provide an apparatus and method that provides consistent coating of parts.

It is another advantage of the present invention to provide a system and method that increases the coating efficiency related to coating parts.

Additional features and advantages of the present invention are described in and will be apparent from, the following Detailed Description of the Invention and the figures.

BRIEF DESCRIPTION OF THE FIGURES

FIG. 6 is an exploded perspective view of the motor housing and part support having a part mounted on the part support.

FIG. 7 is a perspective view of the laser generator and air mover of FIG. 1 where the air mover is directing air across the front surface of the laser generator.

FIG. 8 is a perspective view of the sprayer, motor housing, part support, part and exhaust duct of FIG. 1 where the part is being coated by the sprayer.

FIG. 11 is an enlarged perspective view of one of the air movers of the present invention.

FIG. 12 is an enlarged perspective view of one of the sprayers of the present invention.

FIGS. 21A and 21B are plan views illustrating another embodiment of the present invention where the apparatus measures and coats a rectangular part.

DETAILED DESCRIPTION OF THE INVENTION

Figure 1A:
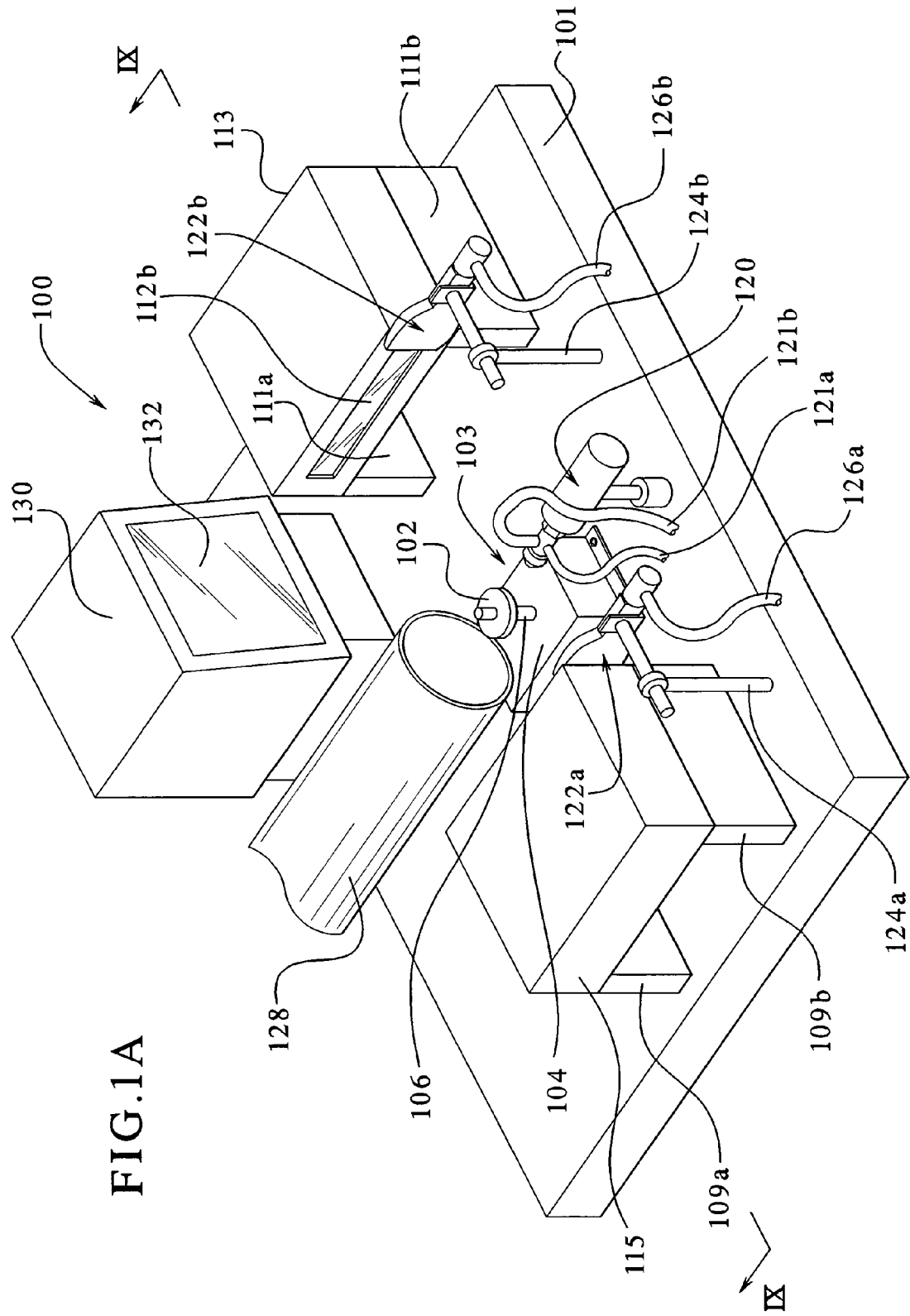
FIG. 1A is a perspective view of one embodiment of the present invention.
Figure 1B:
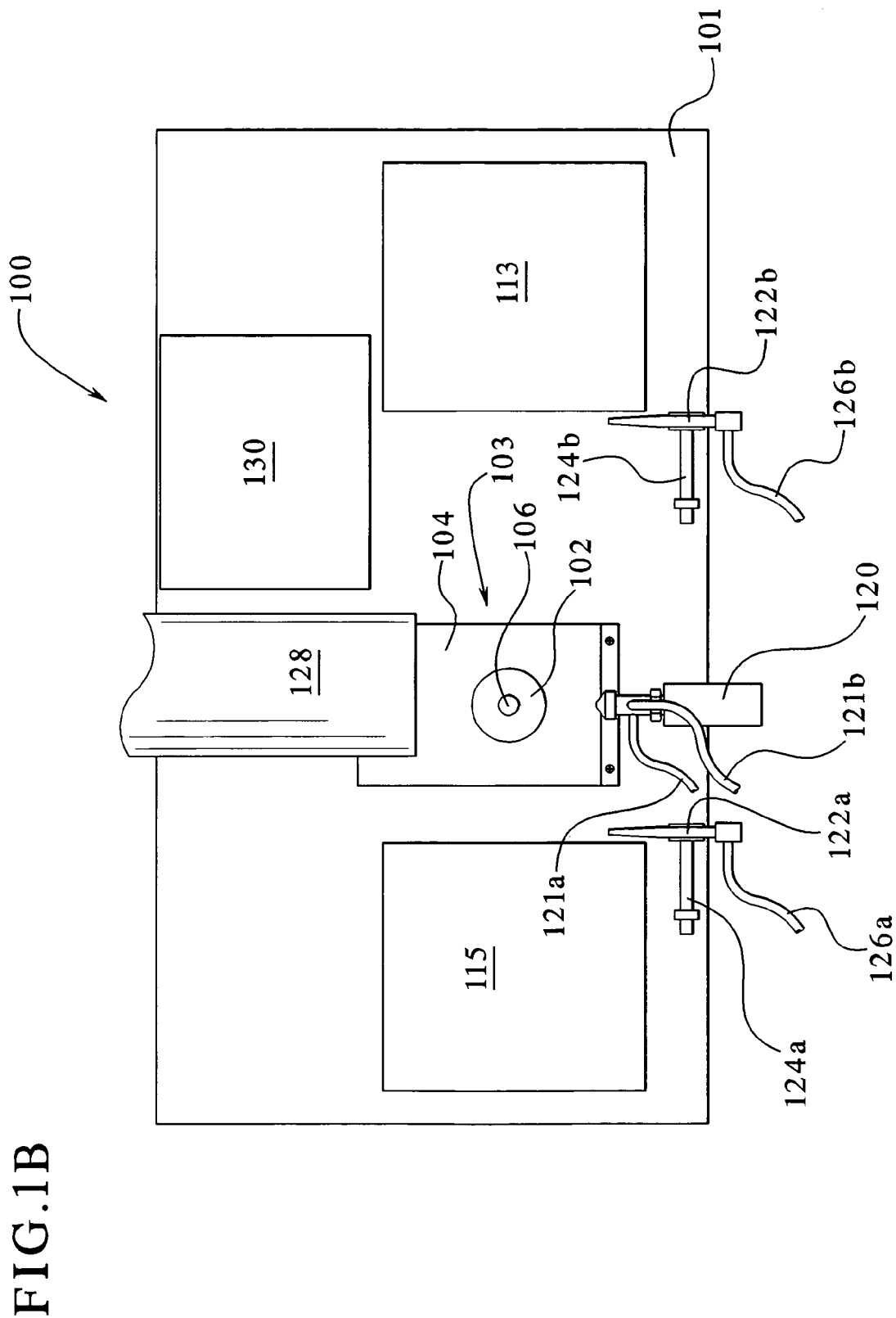
FIG. 1B is a top plan view of the embodiment of FIG. 1A.
Figure 9:
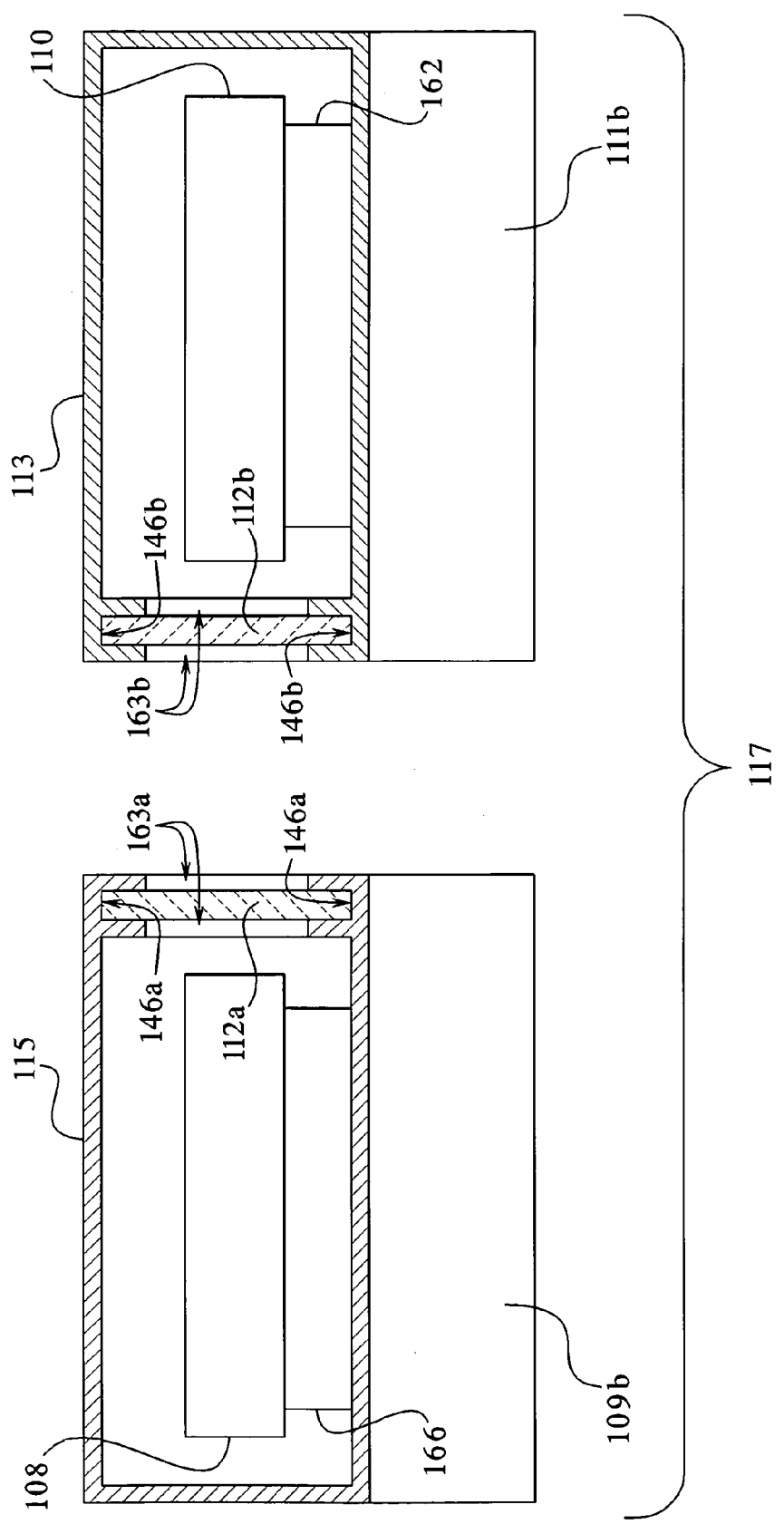
FIG. 9 is a cross-sectional view taken substantially along line IX-IX of FIG. 1 illustrating the laser generator and the laser receiver.
Figure 10:
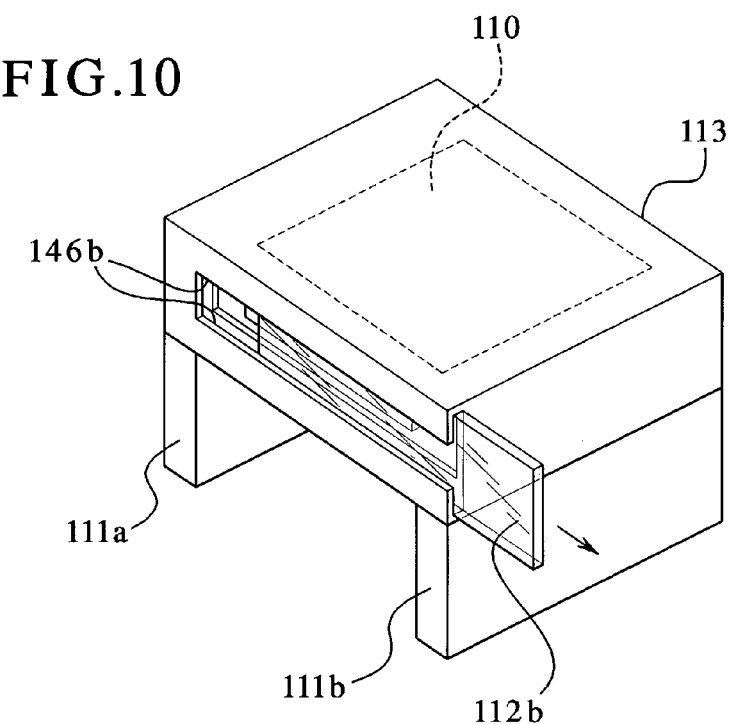
FIG. 10 is a perspective view of the laser generator of FIG. 1 showing a removable glass panel slideably connected to the front of the housing of the laser generator.

Referring now to FIGS. 1, 2 and 9, one embodiment of the coating apparatus 100 of the present invention is illustrated. The apparatus 100 includes a frame, housing, or support 101, a part support 103 connected to the frame for holding a part 102, a sprayer 120 connected to the frame for applying a coating to the part, and a part measurer 117 for measuring a dimension of the part. The frame 101 preferably includes a suitable surface that can support the apparatus of the present invention. In one embodiment, the frame 101 is stationary and secured to a bench or tabletop (not shown). In another embodiment, the frame 101 is transportable so that the frame can be used at remote locations.

The part support 103 includes a housing 104, which is connected to the frame 101 using suitable fasteners or in other conventional manners (not shown). The housing 104 encloses a suitable motor (not shown), which in one embodiment provides power to the spindle 106 to rotate or otherwise move the spindle. The spindle 106 is formed to hold or support the part 102. In one embodiment, the spindle includes a mounting surface shown in FIG. 9. The part 102 is placed onto and secured to the surface so that the part does not move or disengage the spindle 106. In operation, the spindle 106 may move in any suitable direction as needed for coating the part. In one embodiment, spindle 106 rotates in a counterclockwise direction, which in turn rotates the part 102 in a counterclockwise direction. It should be appreciated that the spindle 106 may rotate in a clockwise direction, counter-clockwise direction or any sequence or combination of directions. The spindle 106 may also move up and down or in other directions for coating different sections of the part having different dimensions. In one embodiment, the part support moves or rotates the part and only one portion or dimension of the part 102 is coated by the sprayer. In another embodiment, the part support moves upwards, downwards or in any desired direction to coat more than one portion of a part. In this embodiment, a shield or panel (not shown) is secured to the housing 104 and positioned adjacent to the part on the part support to prevent the shielded portions of the part from being coated.

Figure 2A:
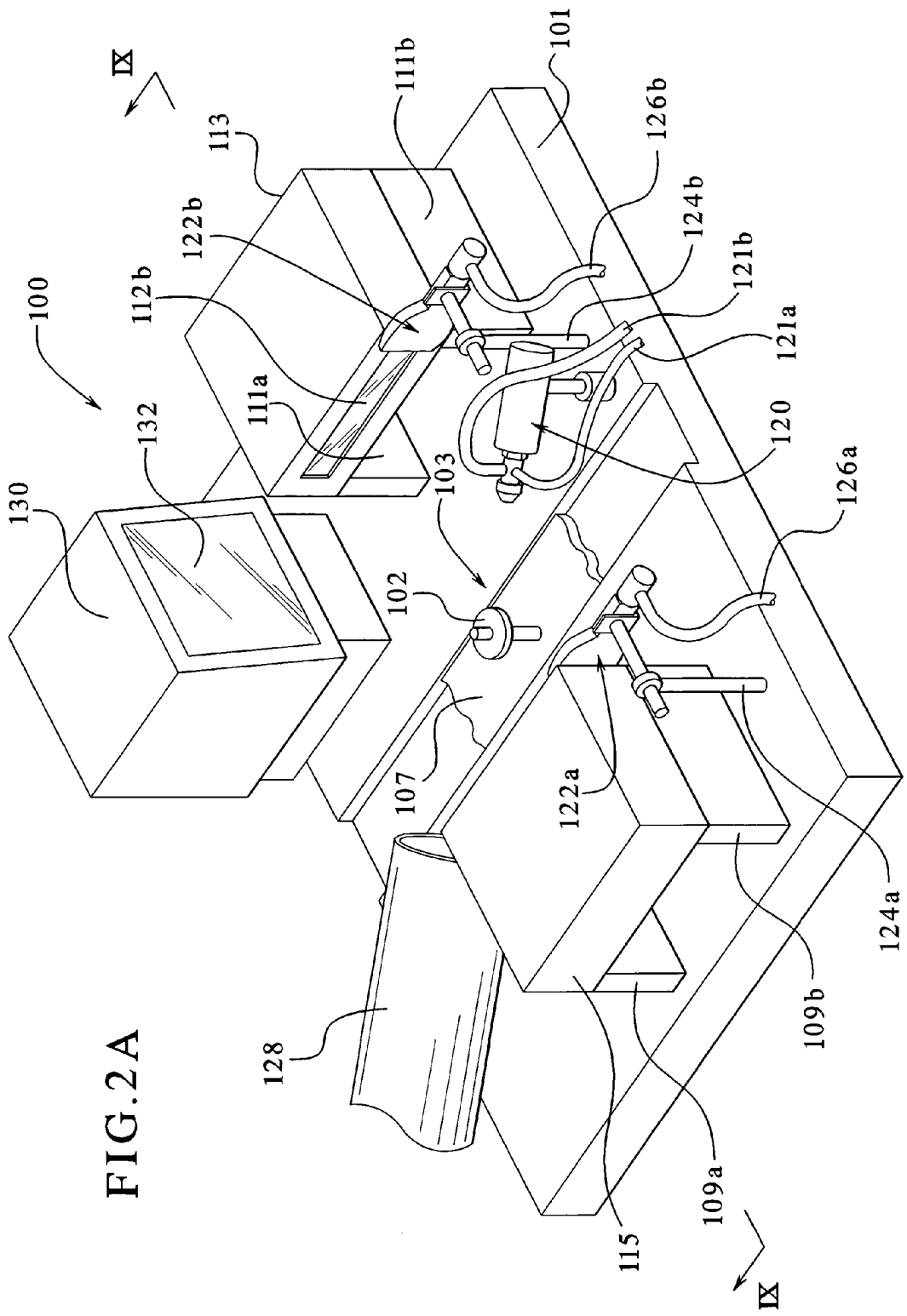
FIG. 2A is a perspective view of another embodiment of the present invention.
Figure 2B:
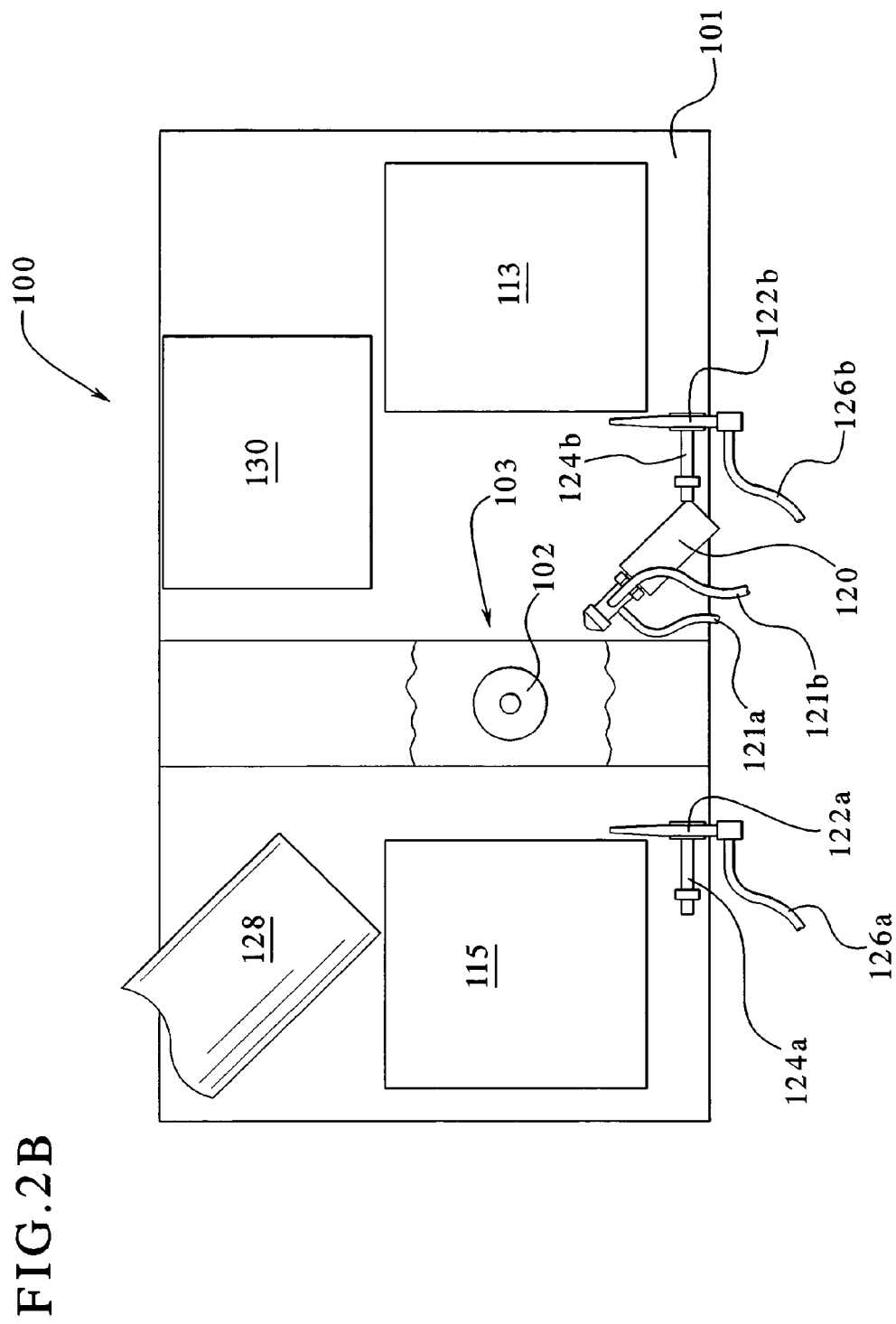
FIG. 2B is a top plan view of the embodiment of FIG. 2A.

In another embodiment of the present invention illustrated in FIGS. 2A and 2B, the part 102 is supported by the spindle 106 which is attached to and transported on a conveyor 107. The part is manually or mechanically placed onto the spindle 106 on the conveyor. The conveyor then transports the part between the laser generator and the laser receiver to a position in front of the sprayer. The part is coated by the sprayer 120 while the laser generator and laser receiver measure the dimension being coated on the part. The conveyor 107 then transports the coated part to other manufacturing areas such as to an oven, furnace or kiln which cures the coating on the part. As a result, all of the components of the apparatus and method of the present invention are fully automated and adapted to sequentially coat a plurality of parts.

In one presently preferred embodiment, a coater such as sprayer 120 is positioned adjacent to the spindle 106. The sprayer may be any suitable sprayer and may emit any suitable type of spray such as liquid spray, powder spray, airless spray, air-assisted spray or any combination therein. The sprayer 120 applies a coating to the part or a portion of the part as the part is moved by the spindle on the part support. It should be appreciated that any suitable sprayer 120, which preferably provides an atomized spray coating, may be used in the present system, such as a pneumatic automatic spray gun manufactured by Paasche Airbrush Company. In the embodiment shown in FIGS. 1 and 12, the sprayer 120 includes a housing 155, which is secured to the frame 101 by support post 158. In one alternative embodiment, the support post is adjustable so that the sprayer is able to coat different portions of a part.

A nozzle 156 extends from the housing 155 to direct the coating emitted from the sprayer 120 towards the part or portion of the part that is being coated. The nozzle 156 is preferably removable from the sprayer housing 155 so that the nozzle can be cleaned or replaced as needed. The nozzle 156 is secured to the housing 155 using suitable fasteners such as conventional co-acting threaded members. It should be appreciated that several different types of nozzles may be used in the sprayer 120 for different types of coating applications.

In another embodiment, two sprayers 120 are employed in the apparatus of the present invention. The sprayer's are connected to the frame and positioned adjacent to the part. In this embodiment, each sprayer may have a different output rate. The output rates may differ based on the amount of coating being applied to the part. The first sprayer coats the part using a high pressure to apply an initial or base amount of coating to the part. The second sprayer coats the part using a lower pressure to apply the final amount of coating. The pressure used to apply the final amount of coating is less than the pressure used to apply the initial amount of coating because the final amount of coating is a smaller amount. The lower pressure enables the operator and/or the processor (i.e., computer) to control the sprayer and therefore, the second sprayer applies the coating with greater accuracy.

Figure 16A:
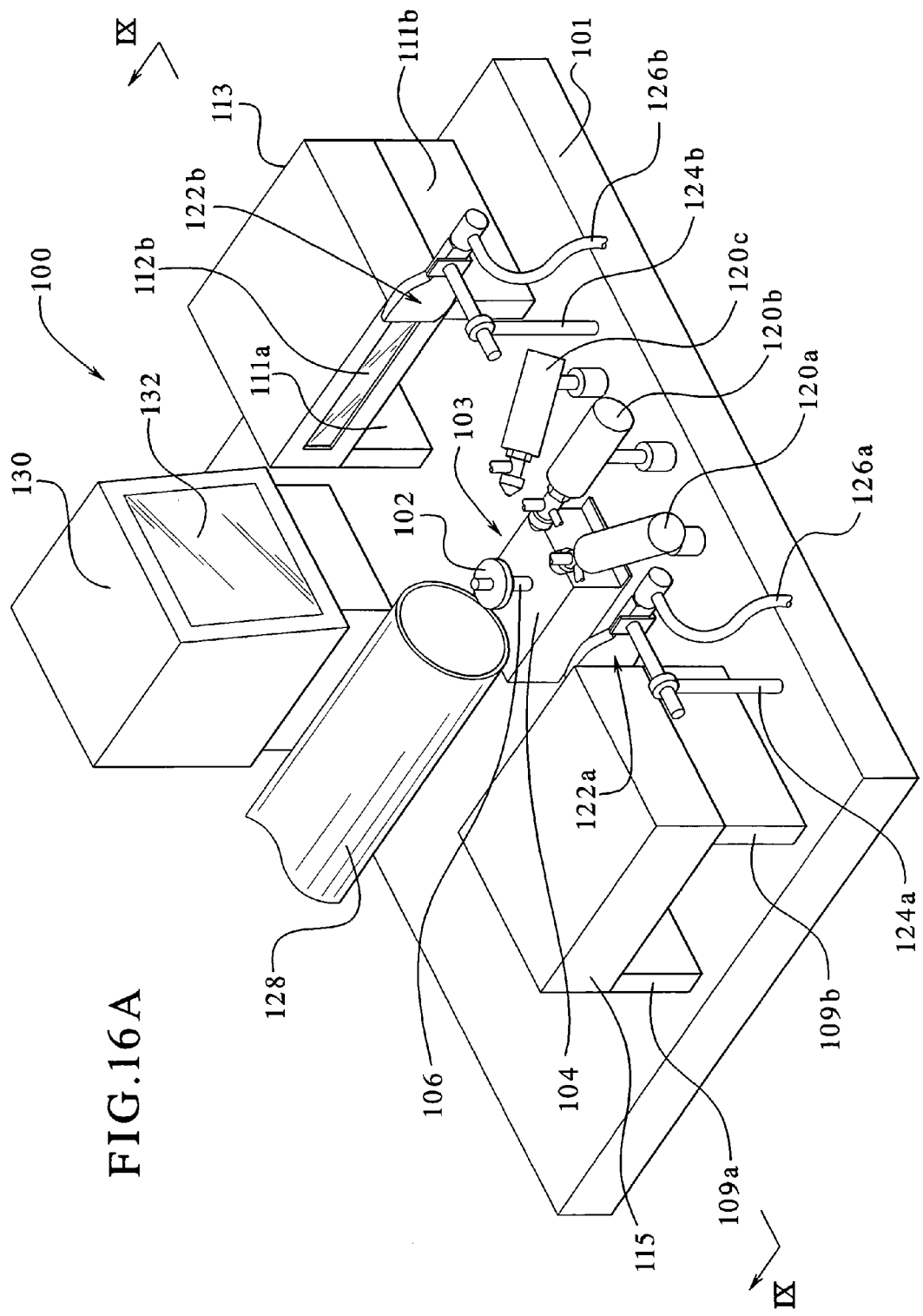
FIG. 16A is a perspective view of a further embodiment of the present invention where the apparatus includes multiple sprayers.
Figure 16B:
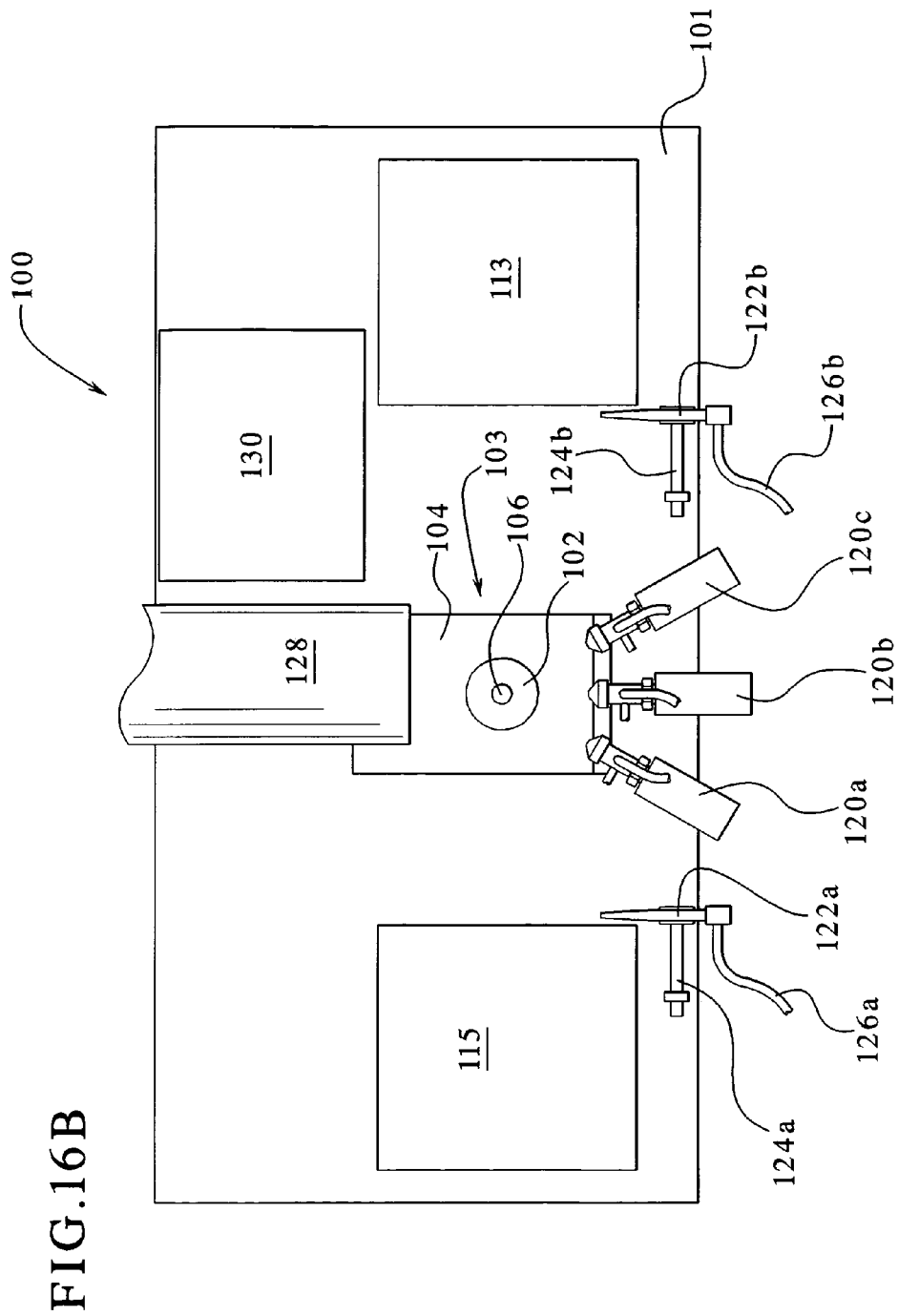
FIG. 16B is a top view of the embodiment of FIG. 16A.

In a further embodiment, two or more sprayers 120 are used to apply multiple coatings to a section of a part. In one aspect of this embodiment, each sprayer applies the same coating to a section of the part. In another aspect, each sprayer applies a different coating to the section of the part. It should be appreciated that the sprayers may apply the same coating, different coatings or any combination of coatings to the section or sections of the part. As shown in FIGS. 16A and 16B, three sprayers 120a, 120b and 120c are positioned adjacent to the part 102 to apply separate, different coatings to the part. In this example, sprayer 120a applies a primer or base coating to the section of the part. Next, sprayer 120b applies a mid-coat or middle coating to the primer layer. Finally, sprayer 120c applies a top coat or final coating to the mid-coat layer. Each sprayer may be independently controlled to apply the coatings at the same or different rates. Additionally, the sprayers may be positioned in any suitable position in relation to the part. The part measurer measures the thicknesses of each of the coating layers as the layers are applied to the part and communicates the coating thickness measurements to the processor, which controls the sprayers. Thus, the overall dimension of the section of the part being coated and/or the thicknesses of the coating layers may be controlled by an operator or processor. It should be appreciated that any suitable number of sprayers and coatings may be employed by the present apparatus. It should also be appreciated that the measurement of the coating may be based on the measurement of the part prior to coating, during coating and after coating.

In a further embodiment, a single sprayer 120 having two different output rates is used to coat the part. The output rates are adjusted or changed by adjusting a dial or other suitable control on the sprayer. The control may be adjusted manually or by a processor. It should be appreciated that one or more sprayers may be employed in the present apparatus and several different output rates may be used as desired.

A suitable coating is transported to the sprayer 120 using coating communication line 121a, which is connected to the front portion of the housing 155. The coating communication line 121a transports or communicates coatings from a coating storage tank or container (not shown), which stores the coating. The coating moves through the coating communication line 121a into the housing 155. The coating then fills the interior of the housing 155 to enable the sprayer to emit a continuous flow of coating onto a part. Similarly, an air communication line 121b transports or communicates pressurized air generated by an air generator such as an air compressor to the housing 155. The pressurized air and coating are simultaneously delivered to the housing 155 and mix inside the housing. The air and coating mixture are emitted from the nozzle 156 as an atomized spray partially due to the pressure created by the compressed air. It should be appreciated that the coating communication line 121a and the air communication line 121b may be manufactured with any suitable tubing that can withstand the pressures of the coating and air inside the tubing during operation of the coating apparatus.

Referring now to FIGS. 1, 2, 9 and 10, in one preferred embodiment of the present apparatus, the part measurer 117 includes a laser generator 110 and a laser receiver 108. As shown in FIGS. 1 and 2, the laser generator 110 is positioned on one side of the part support 103 and the laser receiver 108 is positioned on the opposing side of the part support 103. The laser generator 110 and the laser receiver 108 are aligned and secured to the frame 101. In one preferred embodiment, the laser generator 110 is mounted in a housing 113 that is connected by support arms 111a and 111b to the frame 101. Each support arm 111a and 111b is connected on opposite sides of the housing. The top of the support arms 111a and 111b are secured to the bottom of the housing 113, and the bottom of the support arms 111a and 111b are secured to the frame 101. The support arms are made of a suitable material that will support and maintain the stability of the laser generator 110. The support arms 111a and 111b secure the laser generator 110 in position on the frame 101 so that the laser generator remains stationary during operation.

As illustrated in FIG. 9, in one preferred embodiment, the laser generator 110 includes a laser scan micrometer, such as the LS-5001 laser scan micrometer manufactured by Keyence Corporation, and is mounted inside the housing 113. A support base 162 is connected between the laser scan micrometer and the bottom interior surface of the housing 113 to secure the laser scan micrometer inside the housing. It should be appreciated that the laser scan micrometer may be a free standing device that is positioned and secured inside the housing 113 without a support base 162. The laser scan micrometer is positioned inside the housing 113 so that a laser beam generated by the laser scan micrometer is projected at the proper height and position to contact the part. Opening 162b is formed in the housing 113 so that the laser beam generated by the laser scan micrometer is emitted from the housing 113 towards the laser receiver 108 without being obstructed by the housing.

The laser receiver 108 is connected to the frame 101 and manufactured similar to the laser generator 110. The laser receiver 108 is mounted in a housing 115 which is connected to a pair of support arms 109a and 109b. The support arms 109a and 109b are connected to opposite sides of the bottom of the housing 115. The bottom portions of the support arms 109a and 109b are secured to the frame 101 in a suitable manner. The laser receiver 108 is positioned inside the housing 115 and is supported by the support base 166. The support base is connected between the laser receiver and the housing 115. The laser receiver 108 is positioned so that it is vertically and horizontally aligned with the laser generator 110 or laser scan micrometer. Opening 163a is formed in the front surfaces of the housing 115 to enable the laser beam generated by the laser scan micrometer to be received by the laser receiver 108.

In one embodiment, channels 146a and 146b are formed in the top and bottom portions of housings 113 and 115 near the front surfaces of the housings. The channels are formed to enable transparent sections or members such as glass plates 112a and 112b to be inserted by sliding the plates into the channels 146a and 146b in the front of housings 113 and 115, respectively. In another embodiment, the glass plates are removably connected to the housings using suitable adjustable and/or removable connectors or fasteners. It should be appreciated that the glass plates may be slideably connected, rotatably connected, removably connected or connected to the housings using any other suitable connectors or connecting methods. The glass plates 112a and 112b cover the front surfaces of the housings and protect the laser generator 110 and laser receiver 108 from being coated by excess spray from sprayer 120 that does not adhere to the part or from being damaged during operation. The glass plates 112a and 112b are removable and can be cleaned as necessary. The plates are also transparent to allow the laser beam to pass through the plates. It should be appreciated that other suitable transparent materials may be used as desired by the manufacturer.

Figure 4:
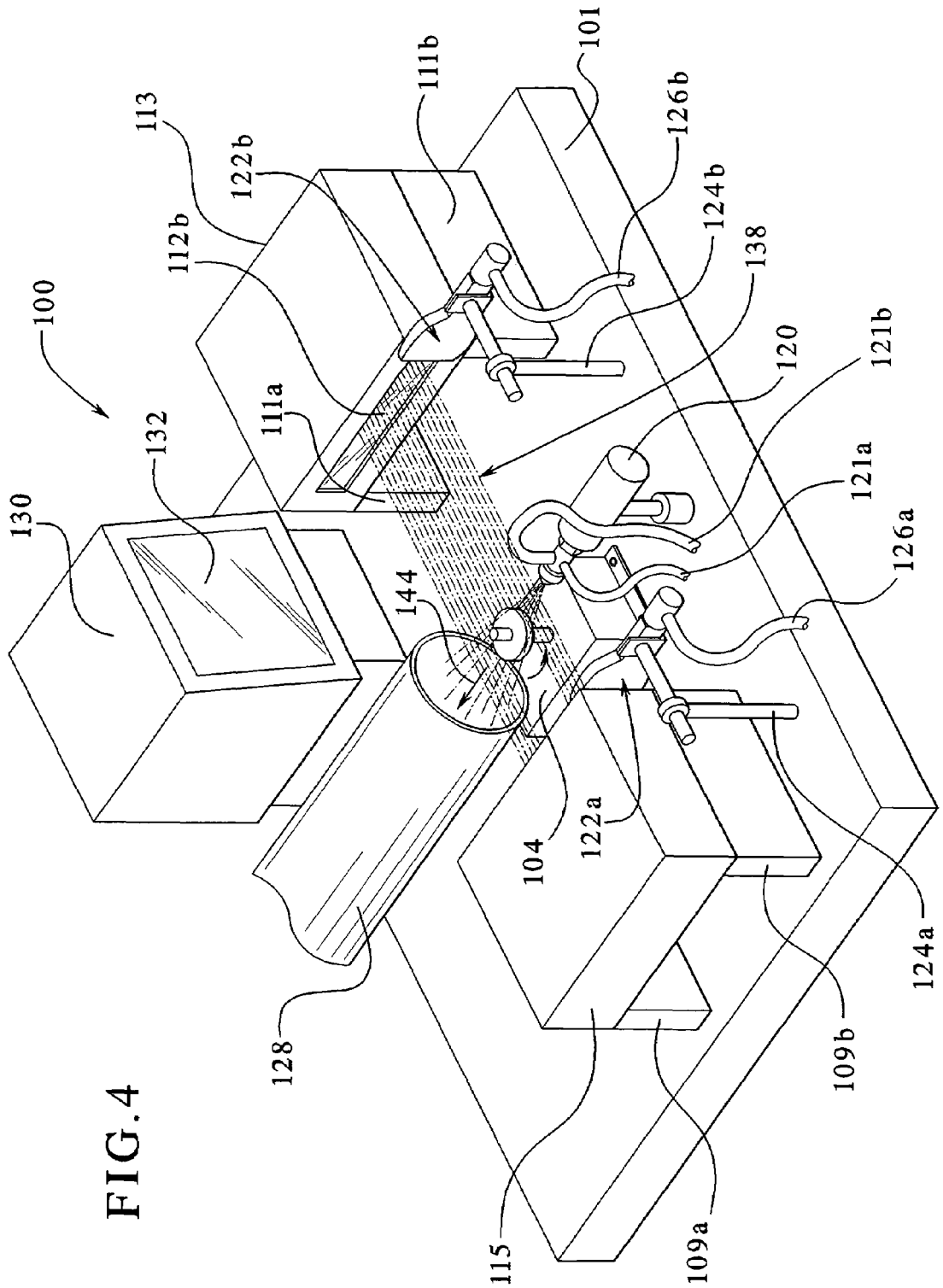
FIG. 4 is a perspective view of the embodiment of FIG. 1 where the outside diameter of a part is measured as the part is coated by the sprayer.
Figure 5:
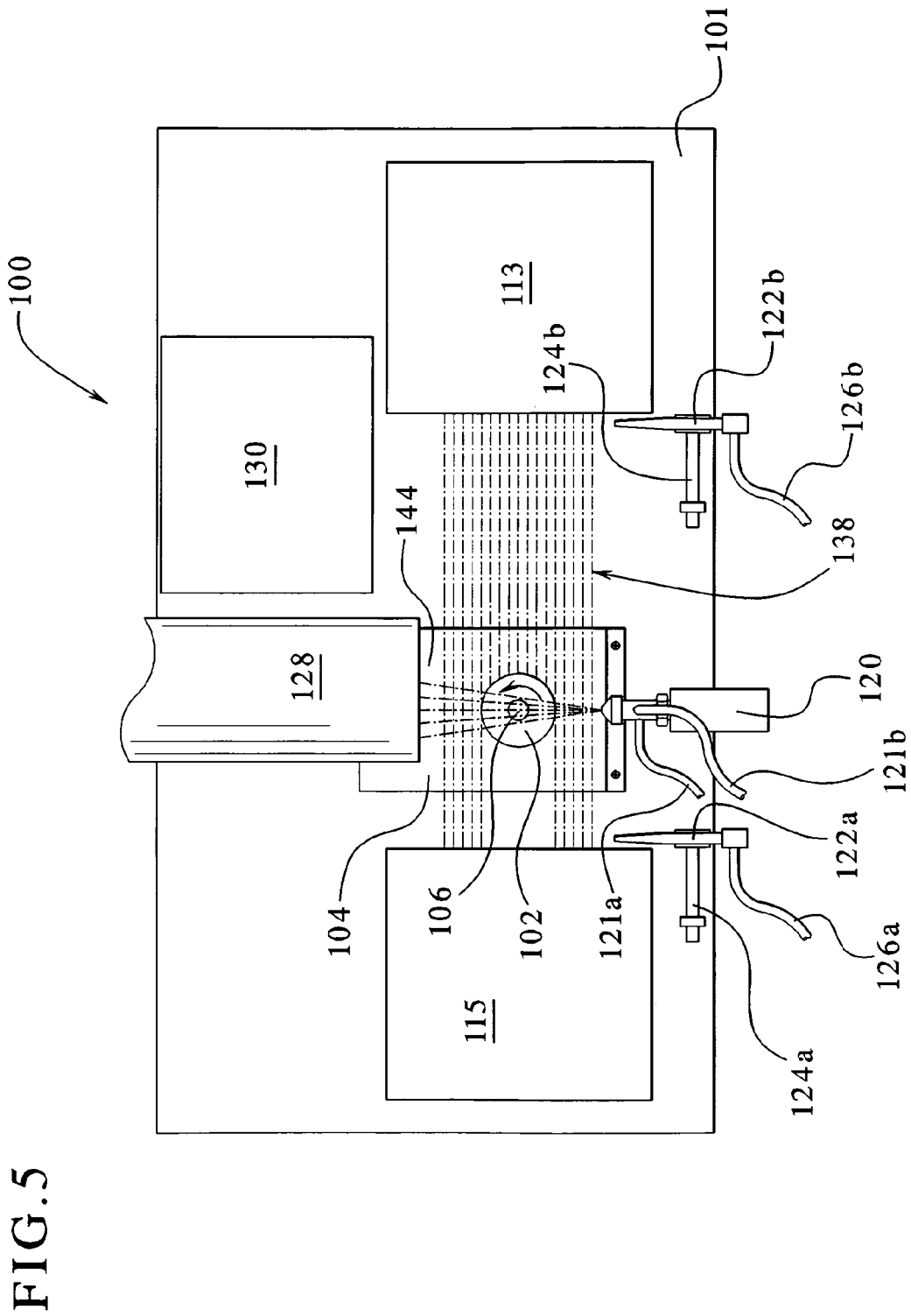
FIG. 5 is a top plan view of the embodiment of FIG. 4.

In operation, the laser generator 110 such as the laser scan micrometer generates a laser beam that comprises several parallel extending rays which are horizontally projected at the level of the part 102. The laser beam is preferably wider than the part that is being measured as shown in FIGS. 4 and 5. As shown in FIG. 4, the laser beam 138 is projected onto part 102 to measure the outer surface or outer diameter of part 102 before, after and as the outer surface is being coated by sprayer 120. The portions of the laser beam 138 that are not blocked by part 102 proceed towards the beam receiver 106 as illustrated in FIGS. 4 and 5. The distance between the unblocked portions of the rays represent the outer dimension or diameter of the part 102. The beam receiver 164 detects and converts the received or unblocked portions of the laser beam to electrical signals. The electrical signals are then communicated or transferred to the processor (not shown) which performs a calculation of the measured dimension of the part based on the signal.

In one embodiment, a plurality of part measurers including at least one laser generator and at least one laser receiver are positioned adjacent to the part on the part support. In this embodiment, each part measurer measures a different section of the part being coated by the sprayer. Therefore, if the apparatus includes two part measurers where each part measurer includes a laser generator and a laser receiver, the first laser generator and first laser receiver project a laser beam and measure a first section of the part being coated and the second laser generator and second laser receiver project a laser beam and measure a second section of the part being coated. It should be appreciated that the part measurers may measure the same section of the part or different sections of the part being coated by the sprayer. Alternatively, one of the part measurers (i.e., a laser generator and a corresponding laser receiver) may measure different coatings applied to the section of the part. In one example, a first laser generator and a first laser receiver projects a laser beam and measures a base coating applied to a section of a part and a second laser generator and a second laser receiver projects a laser beam and measures a top coating or top coat applied to the same section of the part being coated. It should be appreciated that any suitable number of laser generators and laser receivers may be used to measure one or more coatings applied to a section or sections of a part.

Referring now to FIGS. 1 and 2, in one presently preferred embodiment, an exhaust duct 128 is generally positioned on the opposing side of the part support 103 from the sprayer 120. The coating emitted by the sprayer is directed onto the part and any excess is directed towards the exhaust duct. The exhaust duct 128 is positioned adjacent to the part support 103 without obstructing the laser beam generated by the laser generator 110. An exhauster such as a pump (not shown) is connected to the exhaust duct 128 and creates a negative air pressure or suctioning effect at the inlet of the duct 128, which is adjacent to the part support 103. The exhaust duct 128 captures and removes excess coating such as coating overspray from the sprayer that does not adhere to the part during the coating process. The excess coating collected by the exhaust duct 128 is recycled or discarded. A filter (not shown) may be secured inside the exhaust duct 128 to capture the solid material of the coating.

Referring now to FIGS. 1, 2 and 11, in one preferred embodiment, air movers 122a and 122b are positioned adjacent to the laser generator 110 and laser receiver 108 to direct air across the working surfaces of each component and minimize the amount of excess spray or overspray that collects on the glass plates 112a and 112b of the housings for the laser generator and laser receiver. If a significant amount of coating adheres to the glass plates of the laser generator and laser receiver, such coating will obstruct the laser beam generated or received and thereby, creates inaccurate measurements of the part. Because the air movers 122a and 122b are identical, only air mover 122b will be described in detail herein. It should be appreciated that the components and functions of air mover 122a correspond to those of air mover 122b, which is described below.

Air mover 122b is positioned adjacent to a working surface of the laser generator 110 and is connected to the frame 101 by suitable fasteners. The air mover includes an air director or housing 151 and a valve 154. The air director housing 151 is secured to a bracket 148. A vertical support arm 124, which includes an integral support ring 152, is connected to the frame 101 on one end. The support ring 152 is adapted to receive a horizontal support arm 150. One end of the horizontal support arm 150 slides through the support ring 152 on vertical support arm 124. The slideable support arm 150 enables a user to adjust the position of the air mover 122b in relation to the laser generator. Once the position of the air mover is set, suitable fasteners are used to secure the support arm in place within the support ring 152. The other end of the support arm 150 is connected to the mounting bracket 148, which is connected to the housing 151. An air communication line 126 is connected to the valve 154 of the air mover 122b. The air communication line 126 is made of suitable tubing to withstand the air pressure within the tubing. The air is transported from an air generator such as the air compressor described above, to the valve 154. The valve 154 may be a solenoid or other actuator that opens and closes to regulate and control the amount of air that is directed from air mover 122b.

In another embodiment, the sprayer 120 applies a coating or coatings to a section of a part using a pulsing spray to prevent the coating or coatings from obstructing the laser beam emitted by the laser generator, which further enhances the accuracy of the dimension measurements taken by the part measurer. In this embodiment, the processor such as a computer controls the sprayer and causes the sprayer to generate the pulsing spray by activating the sprayer (i.e., turning the sprayer "on") for a designated time interval and then deactivating the sprayer (i.e., turning the sprayer "off") for a designated time interval. The processor also controls the laser generator and causes the laser generator to emit the laser beam as described above (i.e., activates the laser generator) when the sprayer is deactivated or off and deactivates the laser generator when the sprayer is activated or on. Therefore, the processor alternately, sequentially activates and deactivates the sprayer and the laser generator so that when the sprayer is applying a coating to the section of the part, the laser generator is not emitting a laser beam and taking a measurement, and when the laser generator is emitting a laser beam and taking a measurement, the sprayer is not applying a coating to the section of the part. In one embodiment, the alternate sequencing of the sprayer and the laser generator occurs in a short time interval or at least a substantially short time interval. In one example, the sprayer applies an amount of coating to the section of the part for two-tenths of a second and then deactivates. Next, the laser generator generates a laser beam and takes a measurement of the section being coated for two-tenths of a second and then deactivates. This sequence continues until the coating applied to the section of the part achieves a designated or desired coating thickness on the section of the part.

In an alternative embodiment, the sprayer applies a coating to a section of a part by using the pulsing spray method described above while the laser generator remains activated or on (i.e., the laser generator continuously emits a laser towards the part). In this embodiment, the laser generator remains activated but does not take measurements of the section of the part being coated while the sprayer is applying a coating to the section of the part. The sprayer and laser generator therefore alternately, sequentially apply the coating and take measurements of the section of the part. For example, the sprayer applies an amount of coating to the section of the part and then deactivates. Next, the laser generator, which is continuously generating a laser beam, takes a measurement of the section being coated. This sequence continues until the coating applied to the section of the part achieves a designated or desired coating thickness on the section of the part.

In one presently preferred embodiment, a monitor or display device 130 is positioned on the frame 101 so that a user can view the dimension measurements of a part before, after and during the coating operation. The monitor 130 is connected to the processor (not shown) using suitable wires or cables and displays the dimensional measurements of the part calculated by the processor. The monitor enables a user to instantaneously and continuously view the measurements of one or more dimensions of part 102 as the part is being coated and measured by the present apparatus. It should be appreciated that any suitable monitor such as a computer monitor may be used to display the dimension measurement data to a user. The monitor displays the dimension measurements to the user on screen 132.

Figure 14:
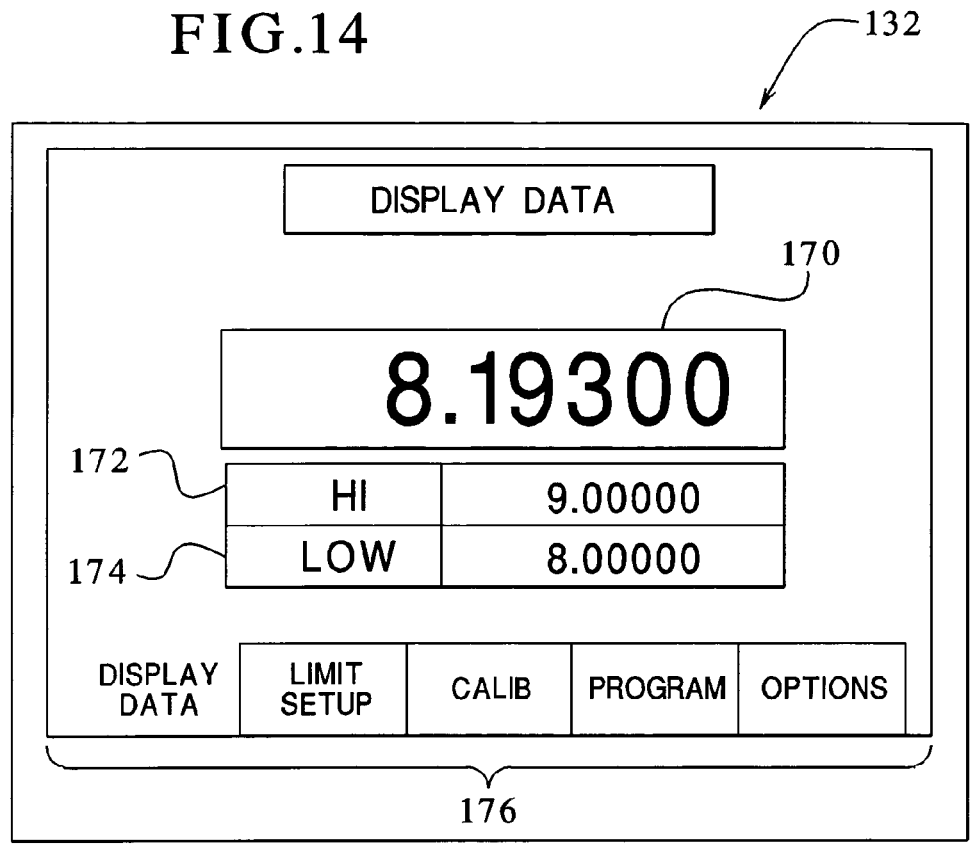
FIG. 14 is an enlarged elevation view of one embodiment of a display screen on a display device in the present invention.

Referring now to FIG. 14, one example of the information that can be entered and displayed on the monitor 130 is illustrated. In this example, the screen 132 on monitor 130 displays the dimensional measurement 170 of a particular dimension of the part 102. The screen can also display the dimensional tolerance levels for a particular dimension of the part such as the upper tolerance level 172 and the lower tolerance level 174. Additionally, other user selectable options can be displayed on the screen 130. As illustrated in FIG. 14, the user can change what type of information is displayed by using control selections 176. It should be appreciated that any suitable type of selection, dimension measurement or other criteria related to the coating and measurement of a part can be displayed on the screen 132 of monitor 130.

The apparatus of the present invention is used to coat a part 102 to achieve a final part or final product that meets predetermined dimensional design specifications established by the manufacturer. The final product, such as cylindrical part 102 shown in FIG. 13, has an upper dimension tolerance level 164, which is the largest acceptable dimension for the particular part after the part has been coated by the apparatus, and a lower dimension tolerance level 162, which is the minimum acceptable dimension for the particular finished part after the part has been coated by the apparatus. The dimension tolerance levels are generally the upper and lower acceptable dimension sizes of the part. The design specifications or tolerance levels may also be based on the thickness of one or more of the coatings applied to the part. In one embodiment, a target dimension or size 160 is established for each part. The target dimension 160 is the desired dimension of the finished parts, after coating, including any dimension adjustment due to heating and drying the coating on the part. In some parts, the difference between the upper and lower tolerance levels is very small (i.e., one thousandths of a centimeter) whereas in other parts there is a greater difference between the upper and lower tolerance levels. The dimension tolerance levels and the part sizes depend on the particular use of the part.

Figure 13:
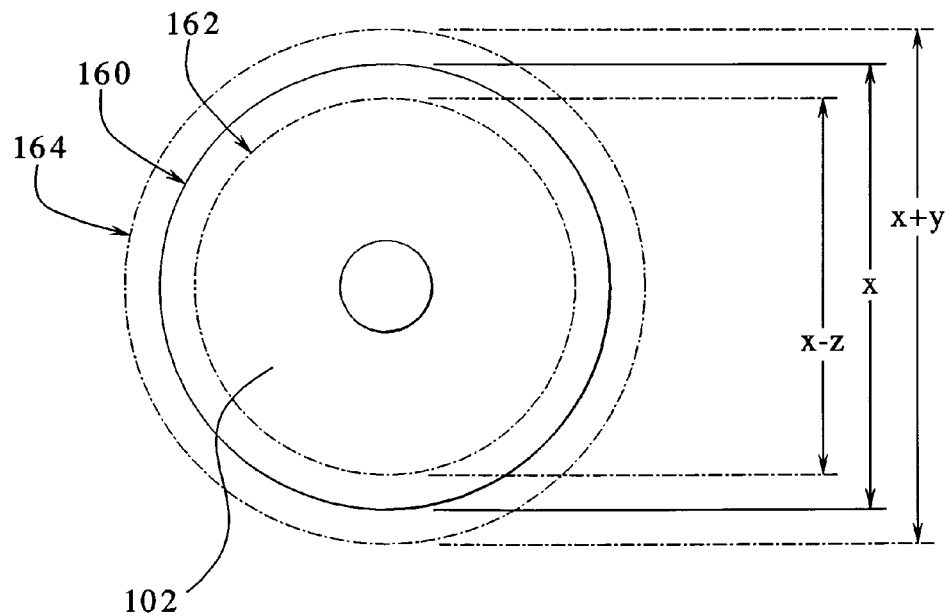
FIG. 13 is a schematic diagram showing the dimension tolerance limits of a particular part.

The goal therefore, is to coat the part so that the final coated part is within the acceptable dimension tolerance levels (i.e., between the upper and lower tolerance levels) and/or coating thickness specifications established for the part and in particular to achieve the optimal dimension size 160 and/or specified coating thicknesses for the part. As an example, the desired dimension of the part 102 may be a dimension "X" as shown in FIG. 13. An upper tolerance level 164 is determined as (X+Y), where Y is a predetermined amount of acceptable dimension variance from the optimal dimension X for the part. The acceptable amount of variance is determined by the manufacturer based on the use of the part. Similarly, a lower tolerance level 162 is determined which, in this case, is the dimension (X−Z) where Z is the acceptable amount of dimension variance for the part. The manufacturer or operator therefore coats the part 102 so that the dimension of the finished part is between the lower tolerance level (X−Z) and the upper tolerance level (X+Y). Again, optimally, the dimension of the finished part is approximately equal to the desired size 160 for the part, which is the dimension X.

Referring now to FIGS. 3A, 4, 5 and 9, one embodiment of the method of the present invention is illustrated where a part 102 is coated by the sprayer 120 based on a desired final dimension for the part. In this embodiment, the part is coated with an initial amount of coating and a final amount of coating. In the preferred embodiment, the initial amount of coating is greater than the final amount of coating. As described above, applying large amounts of coating to a part produces a greater margin of error. On the contrary, applying smaller amounts of coating to a part reduces the margin of error significantly. For example, applying a large amount of coating to a part, such as 95% to 100% of the total amount of coating, may include a margin of error such as plus or minus 2% to 3%. Applying a small amount of coating to the part may include the same margin or error, but because the amount is smaller the relative margin of error is smaller, such as plus or minus 0.02% to 0.03%. Given the above margin of error and that prior known coating processes usually apply all of the coating (i.e., 100% of the coating) to the part at one time, the final amount of coating actually applied to the part, including the margin of error, ends up being between 97% to 103% of the calculated amount of coating to be applied to the part. This range of error is especially problematic when the upper dimensional tolerance is exceeded. The result in several parts being discarded as waste because the parts do not fit within the tolerance levels.

In the present method, however, a smaller amount of coating is applied in a second or final step. By applying a smaller amount of coating in the second step based on the measurement of the coating applied in the first step, the present method reduces the relative margin of error in coating the part. Additionally, in the present method the total calculated amount of coating is based on the desired or target dimension for the coated part. In order to ensure that too much coating is not applied to the part, the sprayer shuts off when the amount of coating applied to the part is within a predetermined percentage of the total calculated amount of coating such as 0.01% to 2%. For example, if 95% of the total amount of coating is applied to the part in the initial step, then the actual amount of coating applied to the part will be between 92% and 98%, taking into account a margin of error of plus or minus 3%. Therefore, in the second step or final step, only 2% to 8% of the total amount of coating needs to be applied to the part to achieve the desired dimension for the part. Again, using a margin of error of plus or minus 3% for the final amount of coating and that the sprayer shuts off when approximately 99.98% to 99.99% of the total amount of coating is applied to the part, the total amount of coating applied to the part will be approximately between 99.94% (i.e., 3% of 2%) to 99.99% Thus, the present method reduces the relative margin of error with respect to the calculated amount of coating that is applied to the part and the final part size, and thereby significantly improves the accuracy associated with the coating method and increases production.

Figure 3A:
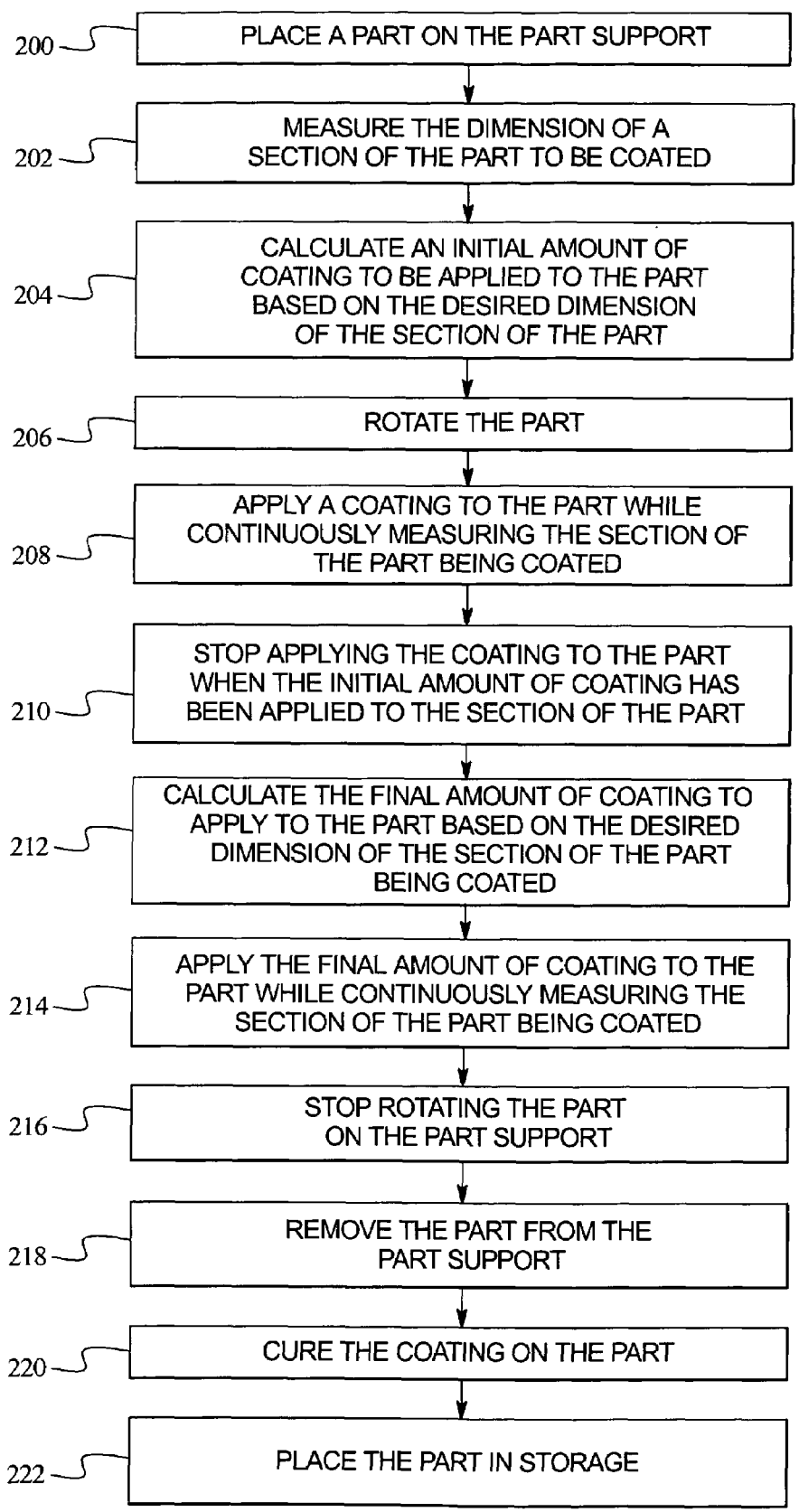
FIG. 3A is a flowchart illustrating one embodiment of the coating method of the present invention.

Referring now to FIG. 3A, the one method of the present invention includes the following steps. The part 102 is placed on the spindle 106 on the part support 103 as indicated by block 200. Next, a laser beam 138 is generated by the laser generator 110 and projected onto the part 102 to measure the part as indicated by block 202. Specific rays or portions of the laser beam are blocked by the part while the unblocked rays or portions of the laser beam are received by the laser receiver 108. The received laser beam, rays or portions are converted into electrical signals and communicated to the processor. The electrical signals indicate the distance between the unblocked portions of the laser beam or the size of the dimension of the part to be coated. The processor receives the signals and calculates an initial amount of coating to apply to the part based on the initial dimension or size of the part received from the laser receiver and the desired size of the part as indicated by block 204. The calculation preferably includes an adjustment factor, which accounts for the change in size of the coated part that occurs when the part dries or cures. In one embodiment, the initial amount of coating is greater than the final amount of coating for the reasons described above. In another embodiment, the initial amount of coating is a significant percentage of the total amount of coating such as approximately 95% of the total amount of coating. It should be appreciated that the initial amount of coating may be any suitable amount or suitable percentage of the total amount of coating which reduces the margin of error associated with the coating method. It should also be appreciated that multiple measurements of the part or dimension of the part may be made. For instance, the part may be rotated to take more than one dimension measurement.

Once the initial amount of coating is calculated by the processor, the operator presses an input such as a button on a control panel (not shown), which starts the coating process. Alternatively, in a fully automated apparatus, the processor communicates with the sprayers and other automated components of the apparatus to begin the coating process. The motor (not shown) in housing 104 is connected to the spindle 106 and rotates the spindle, which in turn rotates the part as indicated by block 204. As the part rotates, the sprayer 120 simultaneously receives the coating through coating communication line 121a and pressurized air through air communication line 121b. The coating and air enter the nozzle portion of the sprayer 120 and the air forces the coating out of the nozzle as an atomized spray. The sprayer 120 applies the coating to the outer surface of the part 102 while the part is simultaneously measured by the part measurer 117 as indicated by block 208. Air movers 122a and 122b direct air delivered via air communication lines 126a and 126b across the working surfaces of the housings holding the laser generator 110 and laser receiver 108. The air movers minimize the amount of overspray or excess coating from the sprayer that accumulates and coats the working surfaces of the housings holding the laser generator and laser receiver during the coating process. Thus, the air movers prevent or minimize the obstruction of the laser beam due to coating accumulation on the working surfaces of the housings holding the laser generator and the laser receiver.

As shown in FIGS. 4 and 5, as the coating is applied to the part 102 by sprayer 120, the outside diameter of the part increases and thereby blocks more of the laser beam 138 as the laser beam passes by the part 102. Thus, the portion of the beam received by the beam receiver 164 decreases in direct proportion to the amount of coating that is applied to the part and the distance between the unblocked portions of the laser beam increases. As a result, the processor continuously calculates a larger dimension measurement for the part being coated as the part is coated by the sprayer.

Figure 3B:
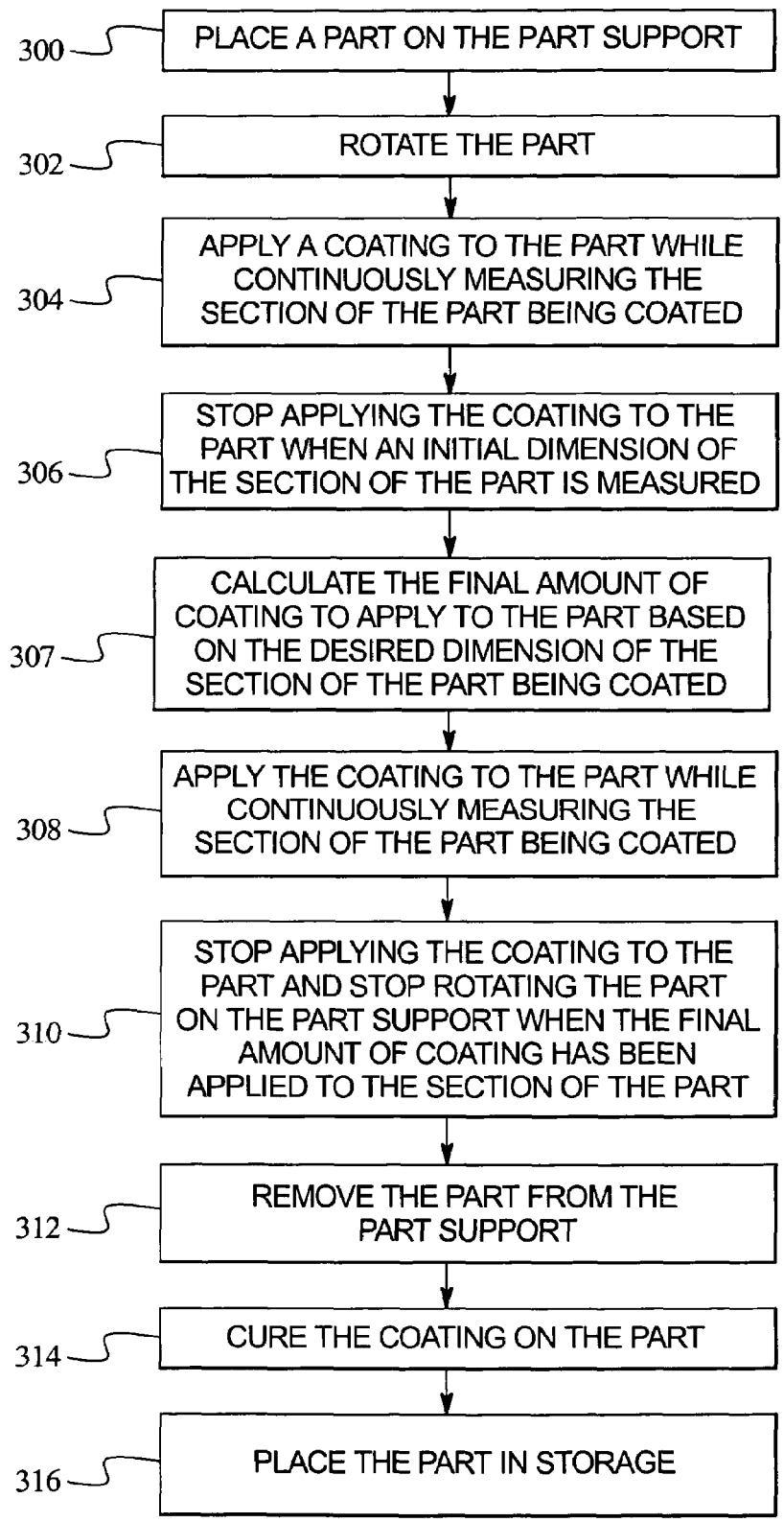
FIG. 3B is a flowchart illustrating another embodiment of the coating method of the present invention.

The processor communicates the dimension measurements to the display device 130, which displays the measurements on screen 132. As a result, the user or operator can continuously monitor the dimension of the section of the part as the section is coated by sprayer 120. This enables the user to know when the part is within the predetermined upper and lower tolerance levels for the part or when an out of control situation such as a equipment malfunction or the like is occurring during the coating process. In one embodiment, the processor delivers a prompt to the user or operator or a robot such as a robotic pick and place device when the size of the part is within the upper and lower tolerance levels. The prompt may be an audio prompt, visual prompt or any other suitable prompt. Once the initial amount of coating is applied to the part 102, the processor signals the part support to stop moving the part 102 and also signals the sprayer 120 to stop coating the part as indicated by block 210 in FIG. 3.

The final amount of coating to finish coating the section of the part is calculated by the processor based on the difference between the final desired part size and the present size of the part including the initial amount of coating applied to the part as indicated by block 212. The sprayer 120 applies the final amount of coating to the part while simultaneously measuring the part as indicated by block 214. When approximately 99.98 to 99.99% of the final amount of coating is applied to the part, the processor signals the part support to stop moving the part and the sprayer to stop applying coating to the part as indicated by block 216. The coated part is removed from the part support as indicated by block 218 and the coating on the part is cured using a suitable curing method such as heating the coated part in an oven as indicated by block 220. When the coating on the part has cured, the part is placed in storage for use or shipping at a later time as indicated by block 222.

Figure 15:
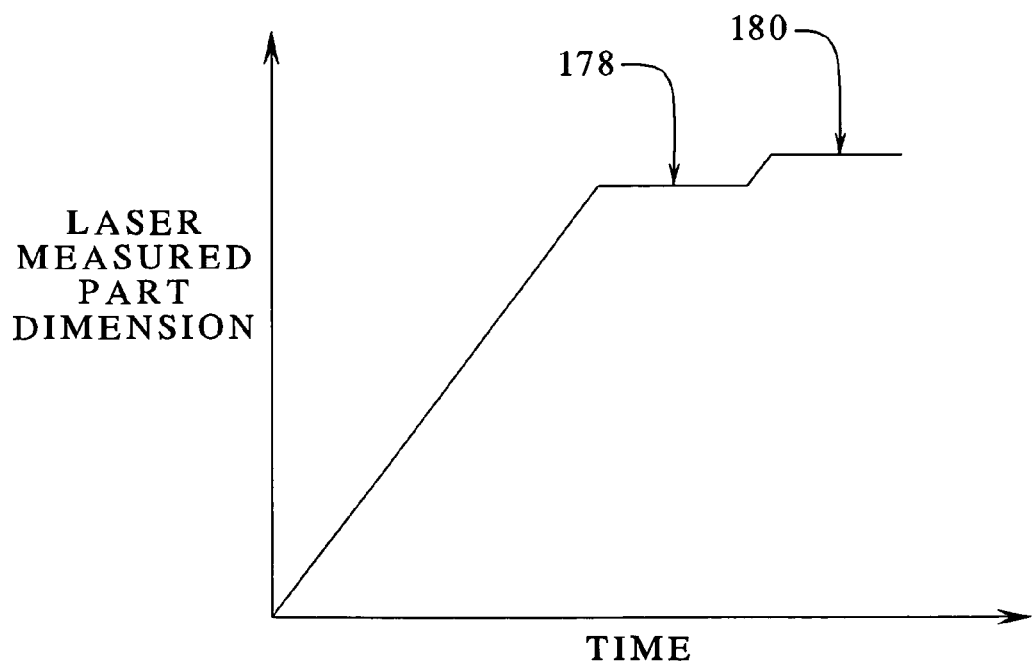
FIG. 15 is a graphical representation of the dimension measurement of the surface of the part being coated versus the coating application time.

Referring to FIG. 15, a graph illustrates the coating method of the embodiment described above. The graph plots the dimension measurement of the coated surface of a part (which includes the thickness of the coating applied to the part), which is indicated on the vertical' axis, versus the time needed to apply the coating to the part, which is indicated on the horizontal axis. An initial dimension measurement of the part, including the amount of coating applied to the part, is indicated by plateau 178 on the graph. Then, the final amount of coating is calculated by the processor and applied to the part to achieve the desired part size or dimension as indicated by plateau 180. The graph further illustrates the difference between the initial dimension measurement of the part, including the initial amount of coating applied to the part, and the final dimension measurement of the part, including the final amount of coating applied to the part, which significantly improves the coating accuracy of the present method.

Referring now to FIGS. 3B, 4, 5 and 9, another embodiment of the method of the present invention is illustrated where a section or a portion of a part is coated. In this embodiment, the part 102 is placed on the part support 103 as indicated by block 300. The operator starts the apparatus by pressing a button, pedal or similar device as described above. The part is rotated on the part support as indicated by block 302. Then, the section of the part being coated is simultaneously sprayed by the sprayer and continuously measured by the part measurer 117 until an initial predetermined dimension, such as approximately 95% of desired dimension, is measured for that section. When the initial dimension is measured by the part measurer, the sprayer stops applying coating to the part as indicated by block 306. The processor then calculates a final amount of coating to apply to the section of the part as described above, to achieve the final part dimension or desired dimension of the section as indicated by block 307. The part is rotated again and the sprayer and part measurer simultaneously coat and measure the section of the part as indicated by block 308. When approximately 99.98 to 99.99% of the final amount of coating has been applied to the section of the part, the part support stops rotating the part as indicated by block 310. The part is removed from the part support as indicated by block 312 and sent to another manufacturing area for curing as indicated by block 314. The part is then stored for use or shipping as indicated by block 316.

Figure 3C:
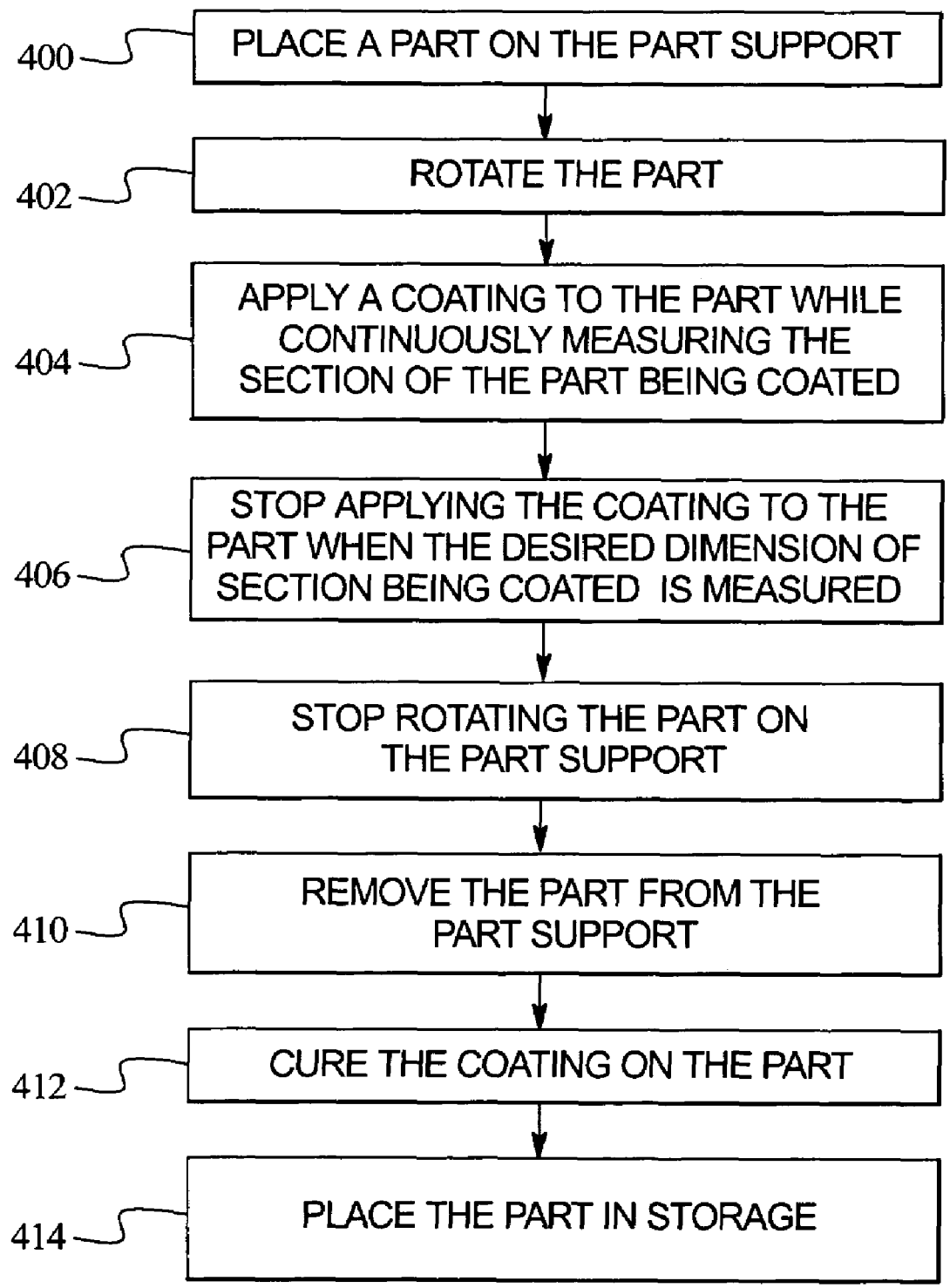
FIG. 3C is a flowchart illustrating a further embodiment of the coating method of the present invention.

In a further embodiment illustrated in FIG. 3C, the sprayer applies a coating to the section of the part being coated while the part measurer continuously measures the section of the part being coated until the final dimension or desired dimension of the section has been measured by the part measurer. In this embodiment, the part is placed on the part support and rotated as indicated by blocks 400 and 402. The sprayer applies a coating to the section of the part while the dimension of the section is continuously measured by the part measurer as indicated by block 404. The sprayer continues to apply the coating to the section of the part until the desired dimension of the section is measured by the part measurer as indicated by block 406. The rotation of the part support is stopped and the part is removed from the part support as indicated by blocks 408 and 410. The coating on the part is then cured and the part is placed in storage for further processing as indicated by blocks 412 and 414.

In one embodiment, the parts are manually placed on and removed from the part support 103 such as the spindle 106 or the conveyor 107. This requires an operator to receive the part from the processing area and then manually place the part on part support 103. Similarly, the operator manually removes the part from the part support after the part has been coated and then sends the part for further processing. In another embodiment, a robotic device, such as a robotic arm (not shown), receives the part from the processing area via an operator or mechanical device such as a conveyor belt, and mechanically places the part on the part support 103. The mechanical handling of the part increases the efficiency and speed of the process and minimizes the amount of human contact with the part. Thus, the parts can be produced efficiently and quickly with minimal physical handling of the part during processing. The robotic device removes the part after it is coated and transports it to another manufacturing area for further processing.

In another embodiment of the invention, the parts are premeasured or measured prior to coating the parts, to determine if the dimension or dimensions of the parts are within a range of acceptable dimensions or sizes. In one aspect, the parts are grouped in lots or batches and a representative sample of the parts is measured to determine if the entire lot or batch is within the acceptable size range. If a predetermined number of sample parts from the batch is not within the acceptable range, the entire batch is discarded or recycled. In another aspect, the section being coated on each part is measured to determine if the dimension of the section fits within the acceptable range of dimensions for the part. Any parts that fit within the acceptable range of dimensions are coated by the apparatus of the present invention.

Figure 17A:
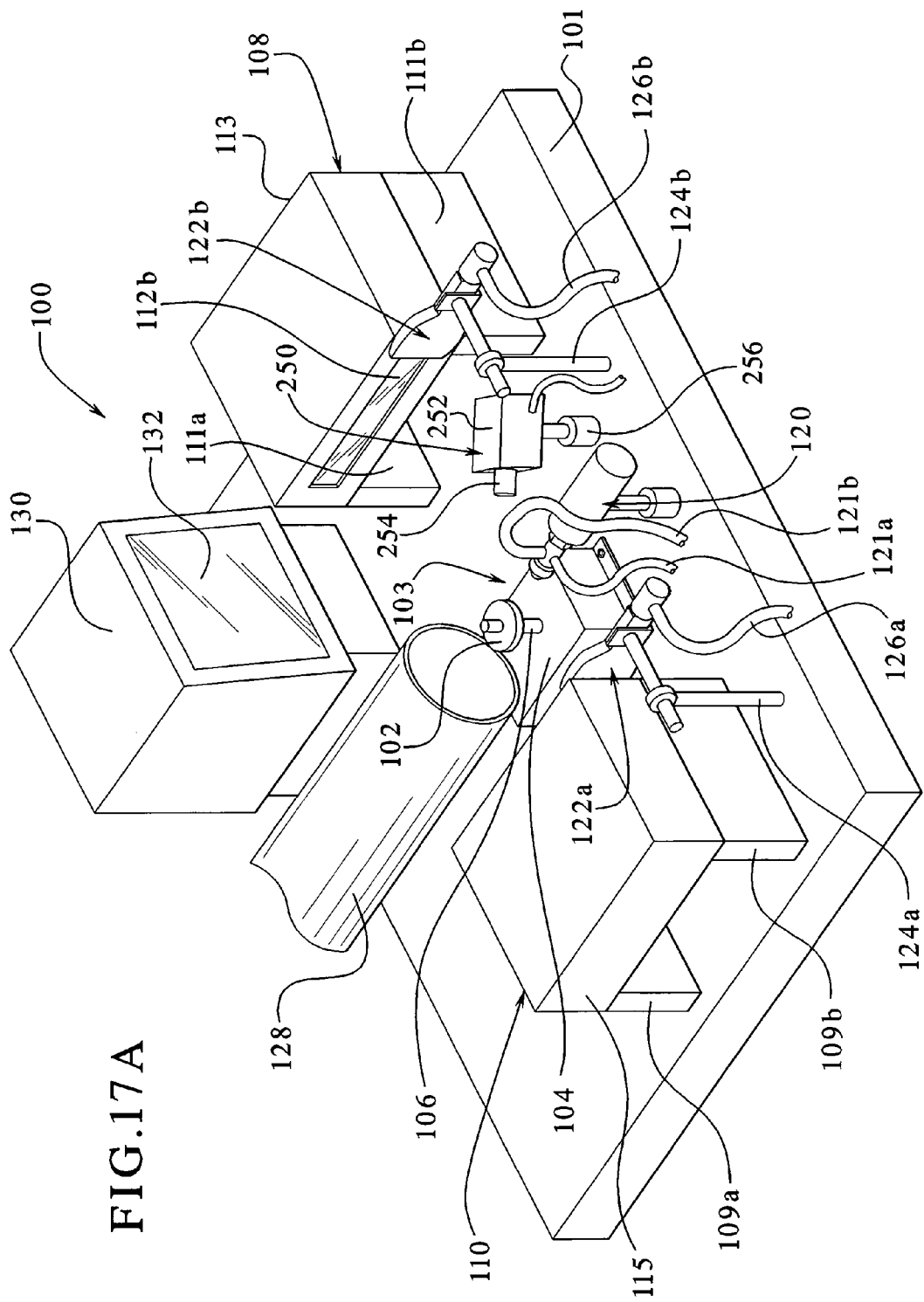
FIG. 17A is a perspective view of an alternative embodiment of the present invention.
Figure 17B:
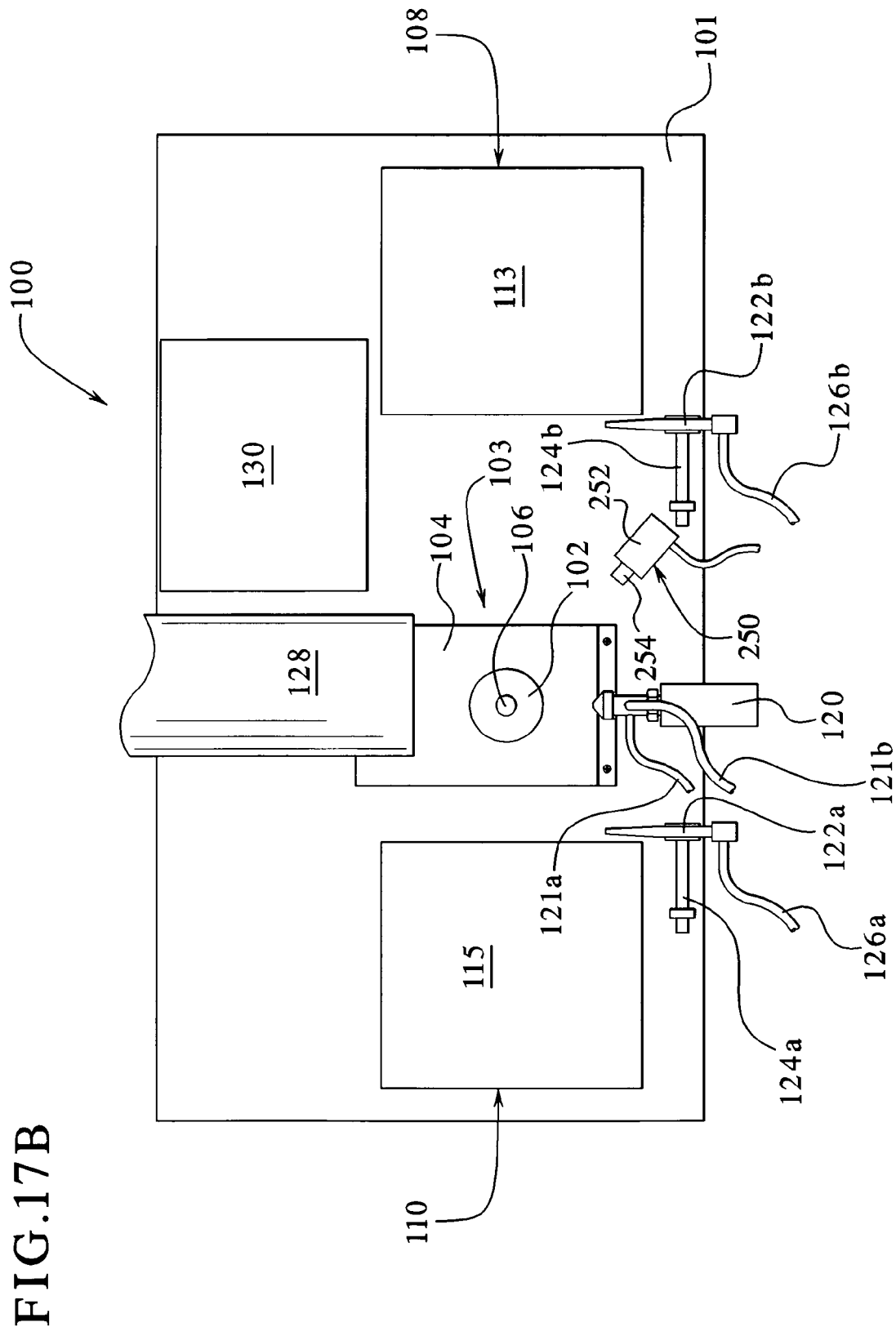
FIG. 17B is a top view of the embodiment of FIG. 17A.
Figure 18:
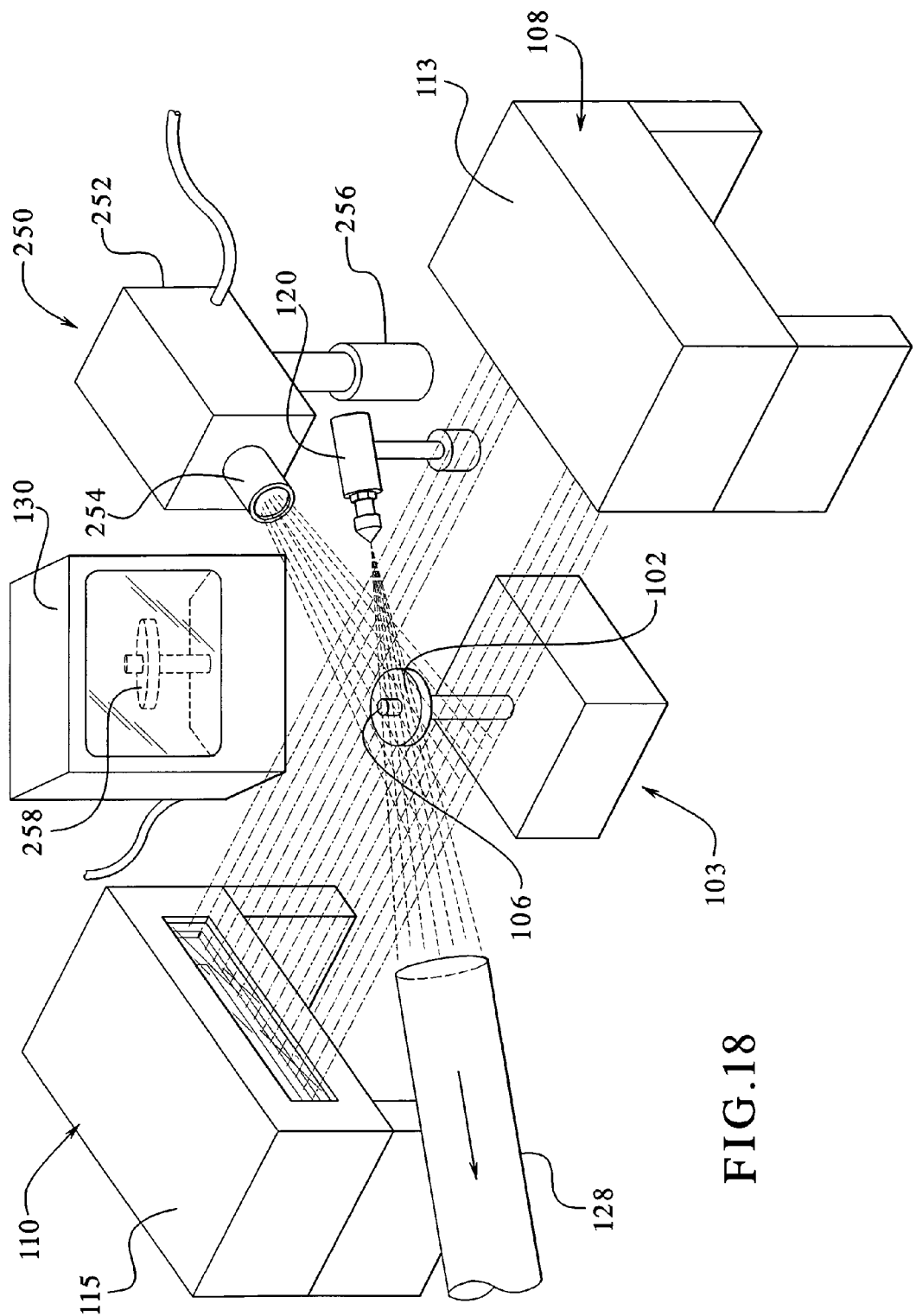
FIG. 18 is an enlarged perspective view of the part measurer of the embodiment of FIGS. 17A and 17B illustrating the part measurer measuring a dimension of a section of a part.

Referring now to FIGS. 17A, 17B and 18, an alternative embodiment of the present invention is illustrated where the part measurer further includes at least one digital camera positioned adjacent to the part support. In this embodiment, the digital camera includes a digital motion picture camera, a digital television camera or a DVT camera. In another embodiment, the term digital camera is meant to include an analog camera in conjunction with a digital converter, which converts the analog picture or pictures taken by an analog camera to digital pictures. It should be appreciated that the digital camera may be any suitable digital camera, digital motion picture camera or any other suitable image taking device. In one embodiment, the digital camera 250 includes a housing 252, a lens assembly 254 and a digital camera or camera support 256. The digital camera 250 is positioned adjacent to the part support and is directed at the position of the part to take a plurality of sequential digital pictures or images of the part as the part is being coated. The sequential digital pictures are then transferred or transmitted via a suitable communication device or connector such as a cable, to a processor (not shown). In one embodiment, the digital camera is connected directly to the processor with a cable or other suitable communication device. In another embodiment, the digital camera and the processor include a wireless communication device which enables the digital camera to communicate with the processor without wires, cables or other types of physical connections. It should be appreciated that any suitable wireless communication device may be employed by the present invention.

Specifically, the housing 252 is a protective housing which protects or covers the internal components of the digital camera such as the electronic components and video components of the digital camera. It should be appreciated that the housing may be made of any suitable material such as metal or plastic. The lens assembly 254 is attached to the housing 252 and is directed or pointed at the part to take the sequential digital pictures of the part 102. The lens assembly includes a suitable lens (not shown) which enables the digital camera to view the entire part. Different types of lenses such as wide angle lenses may be employed in the lens assembly depending on the position of the digital camera in relation to the part being coated.

The lens assembly 254 takes the sequential digital pictures of the part and the digital pictures or images are transferred or transmitted from the digital camera 250 via a suitable communication device described above to the processor (i.e., a computer or similar processor). A display device such as monitor 130 is used to display the digital motion picture of the part (shown in phantom) based on the sequential digital pictures received by the processor as the part is being coated by the sprayer 120. Additionally, the display device displays the dimension measurements calculated by the processor.

In one embodiment, the digital camera 250 and specifically the housing 252 includes a camera support 256. The camera support 256 is movably attached to the frame 101 and thereby enables the digital camera to be moved to adjust the position of the digital camera with respect to the part being coated. The digital camera 250 may be moved laterally on the frame 101, rotate about the support 256 or move in any suitable direction to adjust the position of the digital camera relative to the part being coated. Additionally it should be appreciated that the digital camera 250 is positioned such that it does not interfere with the part measurer and in particular, the laser projected from the laser generator 110 to the laser receiver 108 during the coating and measuring of the section of the part. It should also be appreciated that a recording medium (not shown) such as a magnetic tape, memory card, Random Access Memory (RAM) or other suitable recording medium may be employed by the digital camera to record the sequential digital pictures taken of the section of the part.

Prior to coating a section of a part, the section of the uncoated part or raw part may include a defect or irregularity that causes the part to be unacceptable for coating or outside a predetermined range of acceptable dimensions for the uncoated part. Any unacceptable parts are deemed defective or unacceptable and thereby rejected and discarded prior to beginning the coating process. Additionally, defects or irregularities (i.e., coating drips or lumps) may form on the coated surface or wall of the section of the part during the coating of the section of the part. A part may also have angles, bevels, tapers or other surface formations that require additional measurements to be taken of the section of the part to accurately measure the dimension of these portions of the section of the part during the coating process to ensure that the proper amount of coating is applied to the entire surface of the section.

In one embodiment described above, the part measurer includes a laser generator and laser receiver which measures a dimension of a section of a part being coated at a specific plane or point of the section by projecting a laser plane towards the section being coated. The part measurer, however, will only detect a defect or irregularity on the surface of the section of the part when the defect or irregularity is located in the specific plane of the section being measured by the part measurer unless the part measurer and/or the part support and part are moved to enable the part measurer to measure all of the planes of the section of the part being coated. Moving or adjusting the laser generator and receiver and/or the part support is time consuming and generally not practical after the coating process has begun because the laser generator and receiver have to be adjusted and re-positioned to ensure that correct and accurate measurements are taken of the part. Therefore, if the defect or irregularity is located above or below or otherwise not in the plane of the laser generated by the part measurer, the defect or irregularity will go undetected by the part measurer. As a result the coated part will be defective or unacceptable and have to be discarded. This problem therefore may cause a significant number of parts to be discarded and thereby increase the cost associated with the discarded parts when a particular lot of parts or group of parts are defective prior to coating the parts or are coated with a defect or defects that are not detected by the part measurer.

The part measurer of the present alternative embodiment as described above includes a digital camera, which takes sequential digital pictures of the part during the coating of the part. The digital camera is positioned adjacent to the part support and directed at the position of the part so that each digital picture taken by the digital camera captures the entire surface or wall of the section of the part being coated. Thus, the measurements taken by the digital camera supplement the measurement taken by the laser generator and laser receiver to enable the part measurer to measure the dimension at each plane of the section of the part. Measuring the section of the part at each plane enables the part measurer to detect any defects or unacceptable parts prior to or during the coating process. The defective parts can therefore be discarded prior to coating the parts, which saves coating and money, the coating process can be stopped and adjusted to correct defects formed during the coating of the part or the part can be discarded prior to finishing the coating of the part. This alternative embodiment thereby enables the coating apparatus to accurately monitor the thickness of the coating being applied to each plane or point of the section of the part during the coating process. Additionally, this alternative embodiment detects defects or irregularities on the uncoated part or which form on the section of the part during the coating of the section of the part. This further improves the accuracy of the coating apparatus and reduces waste by reducing the number of defective parts that must be discarded during the coating process.

In one operational embodiment, the digital camera of the part measurer takes sequential digital pictures or images of the part 102 prior to coating the section of the part to determine if the uncoated or raw part includes any defects or irregularities or if the part is otherwise outside of the acceptable dimensions and tolerance limits determined for the part. The digital pictures taken by the digital camera 250 are composed of a plurality of pixels or picture elements wherein each pixel forms a portion of each of the digital pictures or images of the part. Each pixel, a plurality of the pixels or all of the pixels are then transferred or transmitted to the processor, which receives and arranges the pixels of the digital pictures to create a digital motion picture, digital picture or DVT picture of the part as the part is being coated. The pixels of each digital picture are used by the processor to calculate the dimension or dimensions of one or more sections or surfaces of the uncoated part. The laser generator and laser receiver take a measurement of the raw part at a predetermined plane of the part. The digital camera takes sequential digital pictures (i.e., a measurement) of at least one additional plane of the part. The dimensions of the part are then calculated by the processor based on the measurement taken by the laser generator and receiver and the pictures taken by the digital camera. The uncoated or raw part is discarded or not used when at least one of the dimensions of the part are not within a predetermined range of acceptable dimensions for the uncoated part. It should be appreciated that the part measurer of the present embodiment, may measure two or more different dimensions of the part to determine if the part is within the range of acceptable dimensions for the part.

During the coating of a section of the part, the part measurer of the present embodiment takes a digital motion picture of the entire part, and specifically, at least one digital picture of the entire section of the part. It should be appreciated that the part measurer can be used to measure a dimension at one plane of the section of the part or a plurality of planes of the section of the part. Thus, the digital camera and laser generator and receiver of the part measurer work in conjunction to measure at least two planes of a section of a part to significantly improves the accuracy of the measurement of the dimension of the section. For example, the laser generator projects a plane of a laser towards a wall or surface of a section of a part being coated by the sprayer. The laser therefore measures the dimension of the section at a specific plane associated with the section. The unblocked portion of the laser is received by the laser receiver and a measurement is determined. The measurement is transferred to the processor which calculates a dimension for the specific plane of the section. The digital camera supplements the measurement by the laser generator and laser receiver by taking sequential pictures of the entire wall or surface of the section (i.e., from the top of the surface to the bottom of the surface). The pictures are transferred or transmitted to the processor which calculates a dimension for each plane or point of the entire surface of the section of the part. The part measurer including the laser generator, laser receiver and digital camera therefore enables a user to monitor the thickness of the coating being applied to the entire section of the part and the dimension of the entire section of the part while the part is being coated. In this manner, if any defects or irregularities form on the section of the part such as bumps, coating build up or drips, the defects or irregularities are detected by part measurer. The coating operation can then be adjusted or stopped as necessary to correct or eliminate the defective area of the section of the part or the defective part all together.

Figure 19:
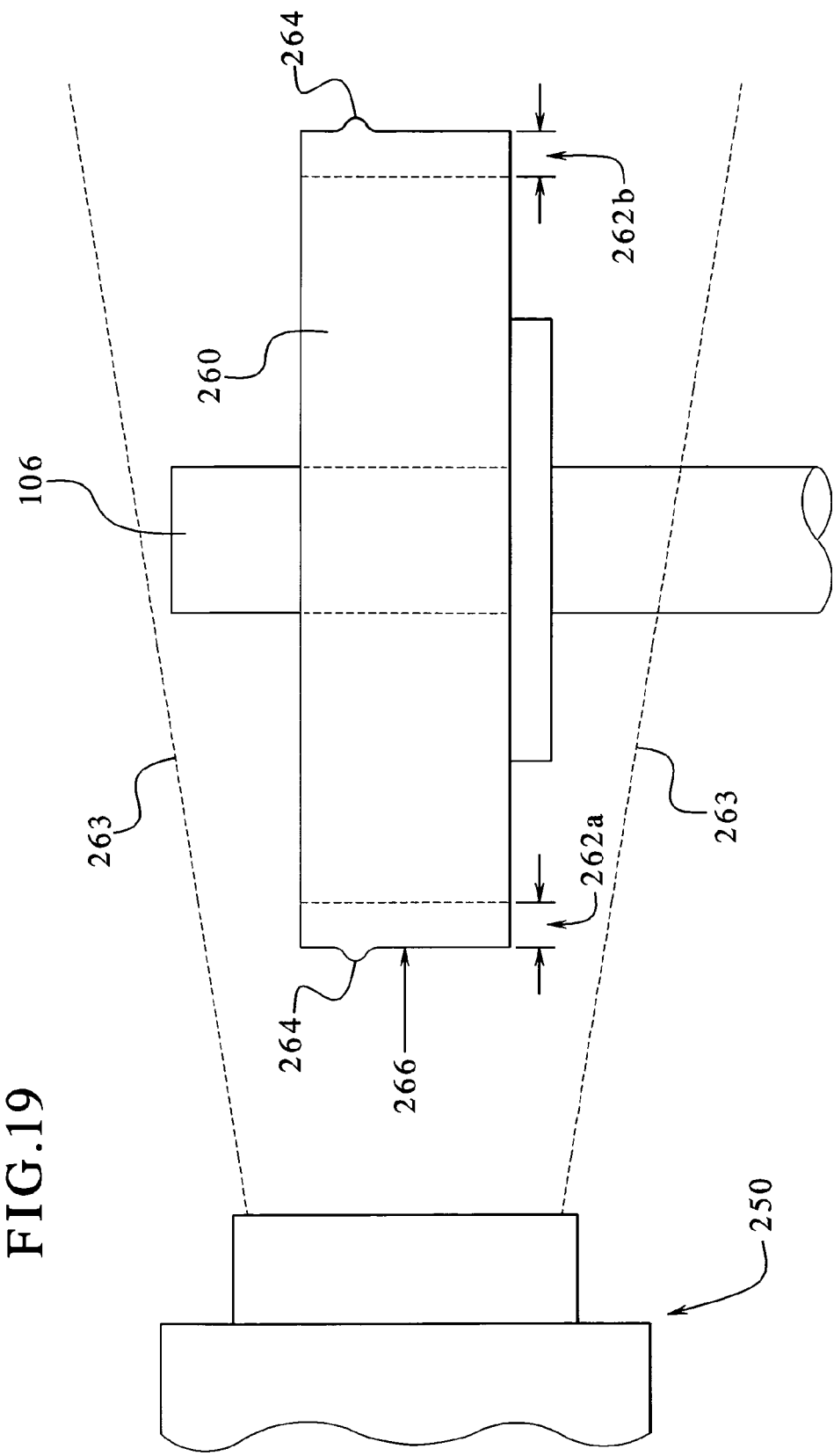
FIG. 19 is an enlarged elevation view of the embodiment of FIGS. 17A and 17B illustrating the measurement of a part including a defect.

Referring to FIG. 19, an example of a round part 260 being measured using the part measurer of the present invention is illustrated where the partially coated part 260 includes a defect or bump 264 which formed on the section of the part during the coating process. As shown in FIG. 19, the digital camera 250 is positioned adjacent to the part and is directed generally at the position of the part being coated to capture the entire image or picture of the part 102 as illustrated by the boundaries of the scope or viewing area 263 of the digital camera. As the part 260 is supported and rotated by spindle 106, the digital camera 250 takes a plurality of sequential digital pictures or images of the entire part 260. The digital pictures or images of the part are then transferred or transmitted to a processor. When a defect or irregularity such as the bump or buildup area 264 forms in the coating areas 262a and 262b applied to the part, the plane of the laser which is illustrated by arrow 266, measures a specific point or area of the section of the part being coated. In FIG. 19, the laser is not measuring the portion of the section of the part including the bump 264 (i.e., coating buildup or drip), which formed above the laser measurement point. The laser generator and laser receiver would have to be adjusted or moved during the coating process to measure the plane of the section including the bump. As described above, moving the part support and/or the laser generator and laser receiver is time consuming, difficult and therefore not practical. Therefore, the measurements by the digital camera of the part measurer supplements the measurement taken by the laser generator and receiver. The digital camera measures the dimensions of the entire surface of the section of the part being coated and thereby identifies any defects or irregularities that form during the coating process such as the bump 264, which may not be detected by the laser generator and the laser receiver as shown in FIG. 19. The digital camera therefore enhances the accuracy of the measurements taken by the part measurer.

Figure 20:
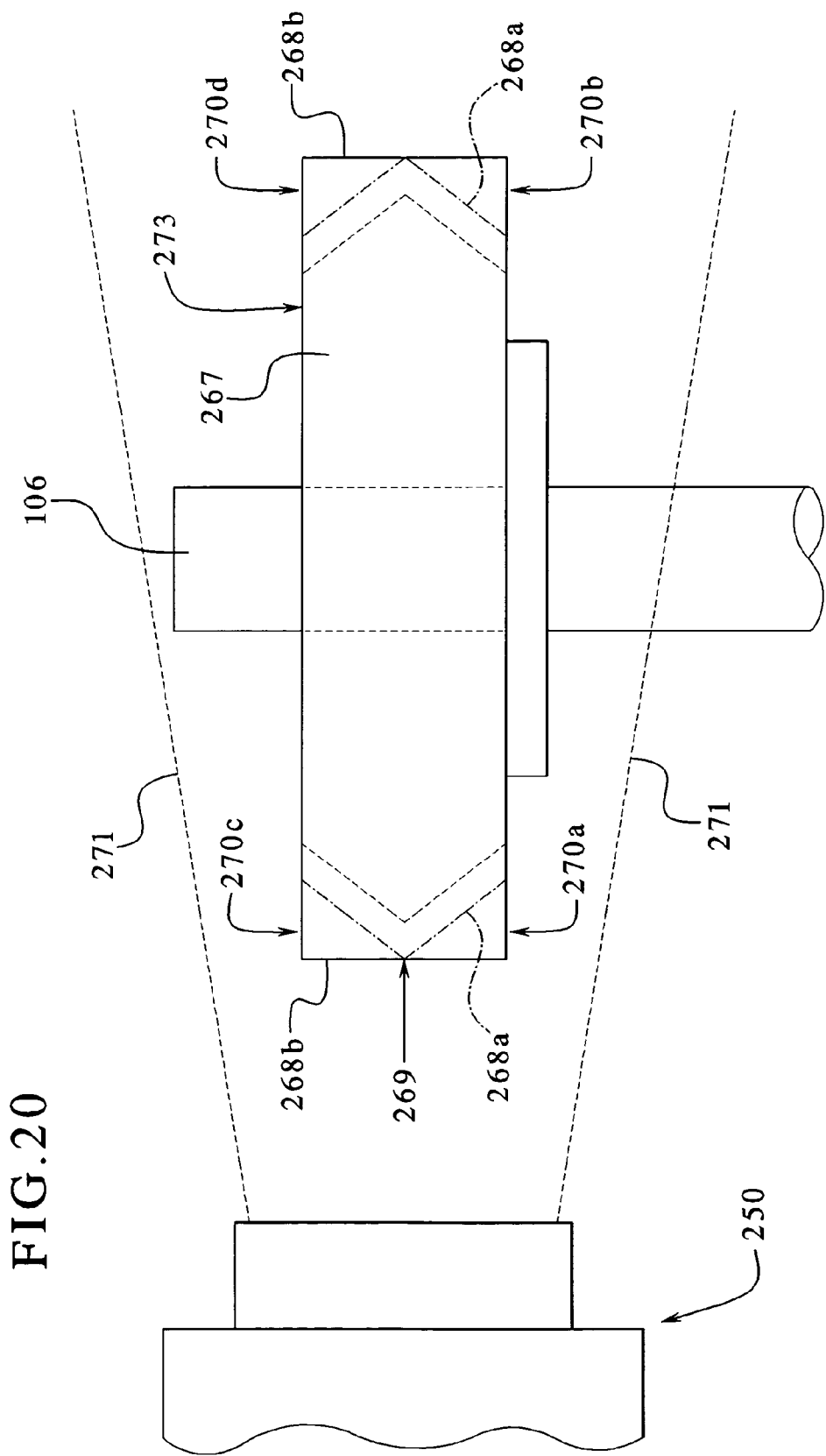
FIG. 20 is an enlarged elevation view of the embodiment of FIGS. 17A and 17B illustrating the measurement of an angled part.

Referring to FIG. 20, another example of a different part being measured is illustrated where the section of the part 267 being measured includes an angled or beveled surface 273 rotated on the spindle 106 and where the thickness of the coating 268 applied to the beveled surface is to be substantially uniform. In this example, the sprayer (not shown) and the part measurer of the present invention simultaneously coat and measure the dimensions of the beveled surface or section 273 of the part until an acceptable dimension is reached for the coated part. The laser generator generates a laser beam plane which measures the thickness or dimension of the part at a specific plane, which is denoted by arrow 269, and is received by the laser receiver. However, in this example, the laser generator and receiver measure the section of the part having the greatest or largest initial dimension. Therefore, when the part measurer including the laser generator and receiver measures the part, the amount of coating applied to the corresponding section of the part is based on that measurement. As a result, excess coating is applied to the portions or areas of the part that do not have the same initial dimension as the dimension at arrow 269. For example, the desired coated surface 268a of the section of the part is shown in phantom. Surface 268a is uniformly coated and is within the acceptable dimension range for the coated part. The surface 268b of the actual coated section of the part, however, includes excess coating in areas 270a, 270b, 270c and 270d because the dimension associated with these areas of the part were above or below the laser plane at arrow 269 and therefore not measured by the part measurer. The excess coating in these areas causes the part to be outside the acceptable dimensions and variances for the part, and the part is discarded.

The part measurer including the digital camera 250 of the present embodiment supplements the laser generator and laser receiver and enables the part measurer to measure the angled or tapered areas of the part 267. Referring to the above example, the digital camera 250 takes sequential digital pictures of the coated part, which is within the boundaries 271 of the scope or view of the digital camera, as the part is being coated and therefore determines the dimensions of each plane of the section of the part including the angled or tapered areas of the part. Thus, the digital camera measures the planes of the section including the angled or beveled surfaces and prevents the excessive coating from being applied to those areas such as areas 270a, 270b, 270c and 270d. Accordingly, the coating of the surface or section of the part can be adjusted during the coating process to prevent the part from being produced with excessive coating and discarded. It should be appreciated that the part measurer including at least one digital camera can be used to measure parts including angled, beveled, tapered, threaded, round, convex, concave or any other irregularly shaped surface associated with a part.

In another alternative embodiment, the part measurer includes a plurality of digital cameras. In one aspect of this embodiment, the digital cameras take digital pictures of the same dimension of a section being coated. In another aspect, at least two digital cameras take digital pictures of different dimensions of a section being coated. In a further aspect, at least two digital cameras take digital pictures of dimensions of different sections on the part being coated. The different digital cameras therefore enable a user to be able to take digital pictures of different sections of the part as the part is being coated.

In a further alternative embodiment, the part measurer includes at least one digital camera, but does not include a laser generator and a laser receiver. In this embodiment, the digital camera are positioned adjacent to the part support and directed at the position of the part being coated. The digital cameras operate as described above to measure different planes of a dimension of a section of a part. The digital cameras may also be used to measure the dimension of different sections of the part.

Referring to FIGS. 21A and 21B, another embodiment of the present invention is illustrated where sections of parts that are not round are measured by the part measurer and coated by the sprayer. In this embodiment, the sprayer 120 and the part measurer simultaneously measure and coat the non-round surface of the part by measuring two axes or a first and second dimension of the surface of the part. For example in FIGS. 21A and 21B, the part measurer includes a laser generator, a laser receiver and a digital camera as described above. The laser generator 110 generates a planar laser beam and projects the beam towards the outer surface of the rectangular part 272 as the part is rotated on spindle 106. Also, the digital camera 250 is directed at the part and takes sequential digital pictures of the part during the coating process. While the part 272 is rotated and coated on spindle 106, the part measurer measures a first dimension of the outer surface of the part, which is dimension X (i.e., the length of the surface). The part measurer then measures a second dimension Y (i.e., the width of the surface) of the outer surface of the part 272.

Specifically, the unblocked portion of the laser beam is received by the laser receiver 108 and the sequential digital pictures of the part are taken by the digital camera as shown in FIGS. 21A and 21B. The measurement data generated by the laser generator, laser receiver and digital camera are then transferred to a suitable processor such as a computer (not shown). Both dimension measurements are continuously transmitted to the processor to determine the thickness of the coating 274 on the surface of the part as the coating is being applied to the surface of the rectangular part 272 by the sprayer 120. Therefore, the thickness of a coating on the part is calculated and determined by measuring the different axes or dimensions of the surface of the part being coated while the surface is being coated. It should be appreciated that the rotation of the spindle 106 and thereby the rotation of the part 272 can be adjusted based on the type of coating being applied to the surface of the part and based on the desired dimensional tolerances or variances for the coated part. Additionally, the coating application rate of the sprayer can be adjusted to account for different sized or shaped surfaces on different parts.

Figure 22:
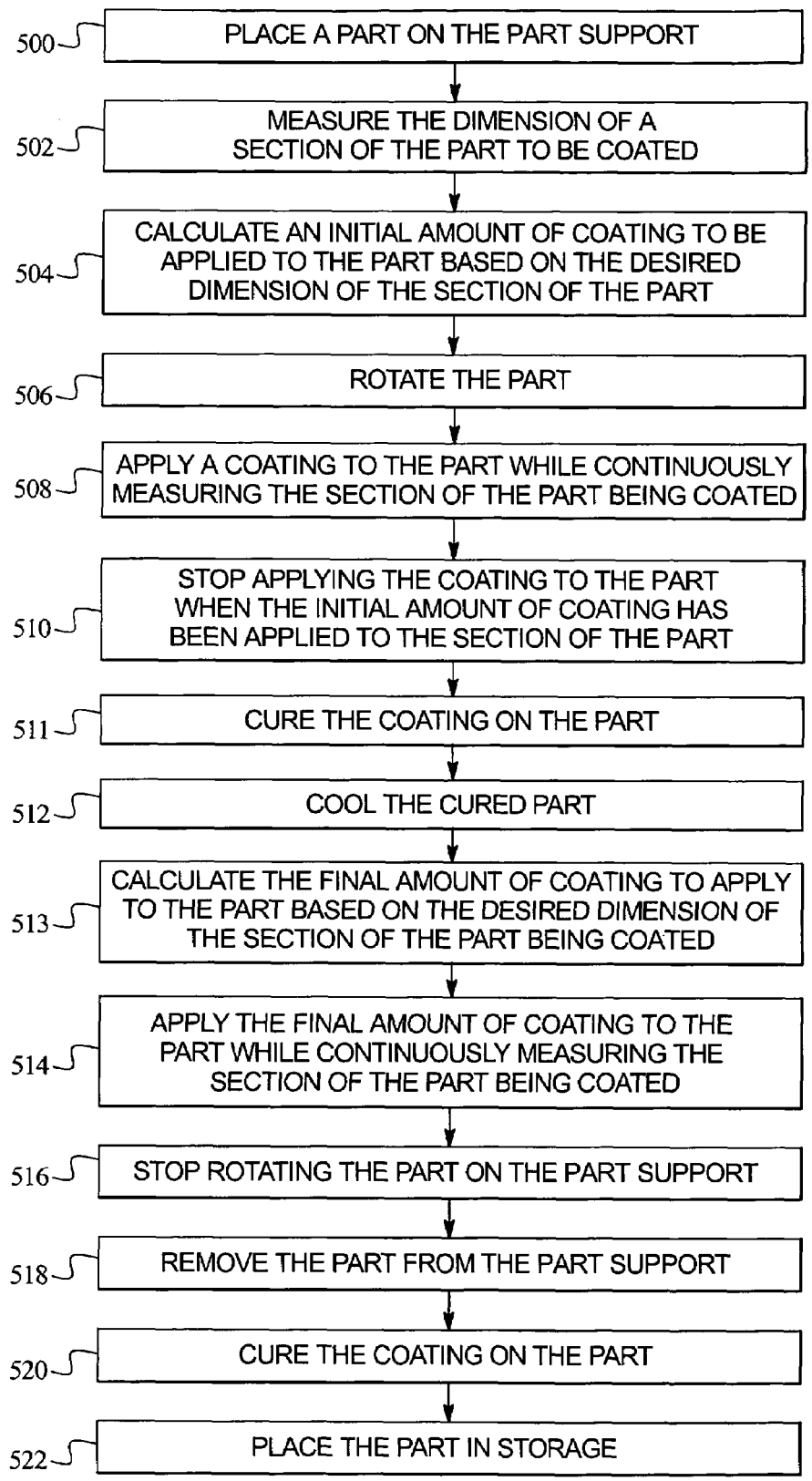
FIG. 22 is a flowchart illustrating another embodiment of the coating method of the present invention including an additional curing step and an additional cooling step.

Referring now to FIGS. 17A, 17B and 22, another method of the present invention includes the following steps. The part 102 is placed on the spindle 106 on the part support 103 as indicated by block 500. Next, a laser beam 138 is generated by the laser generator 110 and projected onto the part 102 while digital camera 250 takes at least one digital picture of the part 102, to measure a dimension of a section of the part being coated as indicated by block 502. Specifically, specific rays or portions of the laser beam are blocked by the part while the unblocked rays or portions of the laser beam are received by the laser receiver 108. The received laser beam, rays or portions are converted into electrical signals and communicated to the processor. The electrical signals indicate the distance between the unblocked portions of the laser beam or the size of the dimension of the part to be coated. Additionally, the digital picture or pictures of the section of the part being coated taken by the digital camera 250 are also transmitted to the processor. The processor receives the signals and pictures and calculates an initial amount of coating to apply to the part based on the initial dimension or size of the part received from the laser receiver, the digital camera and the desired size of the part as indicated by block 504. The calculation preferably includes an adjustment factor, which accounts for the change in size of the coated part that occurs when the part dries or cures. It should be appreciated that multiple measurements of the part or dimension of the part may be made. For instance, the part may be rotated to take more than one dimension measurement.

Once the initial amount of coating is calculated by the processor, the operator presses an input such as a button on a control panel (not shown), which starts the coating process. Alternatively, in a fully automated apparatus, the processor communicates with the sprayers and other automated components of the apparatus to begin the coating process. The motor (not shown) in housing 104 is connected to the spindle 106 and rotates the spindle, which in turn rotates the part as indicated by block 506. As the part rotates, the sprayer 120 simultaneously receives the coating through coating communication line 121a and pressurized air through air communication line 121b. The coating and air enter the nozzle portion of the sprayer 120 and the air forces the coating out of the nozzle as an atomized spray. The sprayer 120 applies the coating to the outer surface of the part 102 while the part is simultaneously measured by the part measurer as indicated by block 508 may be an audio prompt, visual prompt or any other suitable prompt. Once the initial amount of coating is applied to the part 102, the processor signals the part support to stop moving the part 102 and also signals the sprayer 120 to stop coating the part as indicated by block 510. The coated part is then pre-cured using a suitable curing device such as a curing oven and cooled as indicated by blocks 511 and 512, respectively. The pre-curing step removes a substantial portion of the volatiles residing on the coated section of the part.

The final amount of coating necessary to finish coating the section of the part is calculated by the processor based on the difference between the final desired part size and the present size of the part including the initial amount of coating applied to the part as indicated by block 513. The sprayer 120 applies the final amount of coating to the part while part is simultaneously measured using the laser generator, laser receiver and digital camera as indicated by block 514. When approximately 99.98 to 99.99% of the final amount of coating is applied to the part, the processor signals the part support to stop moving the part and the sprayer to stop applying coating to the part as indicated by block 516. The coated part is removed from the part support as indicated by block 518 and the coating on the part is cured in a final curing step using a suitable curing method as indicated by block 520. When the coating on the part has cured, the coated part is placed in storage for use or shipping at a later time as indicated by block 522.

Figure 23:
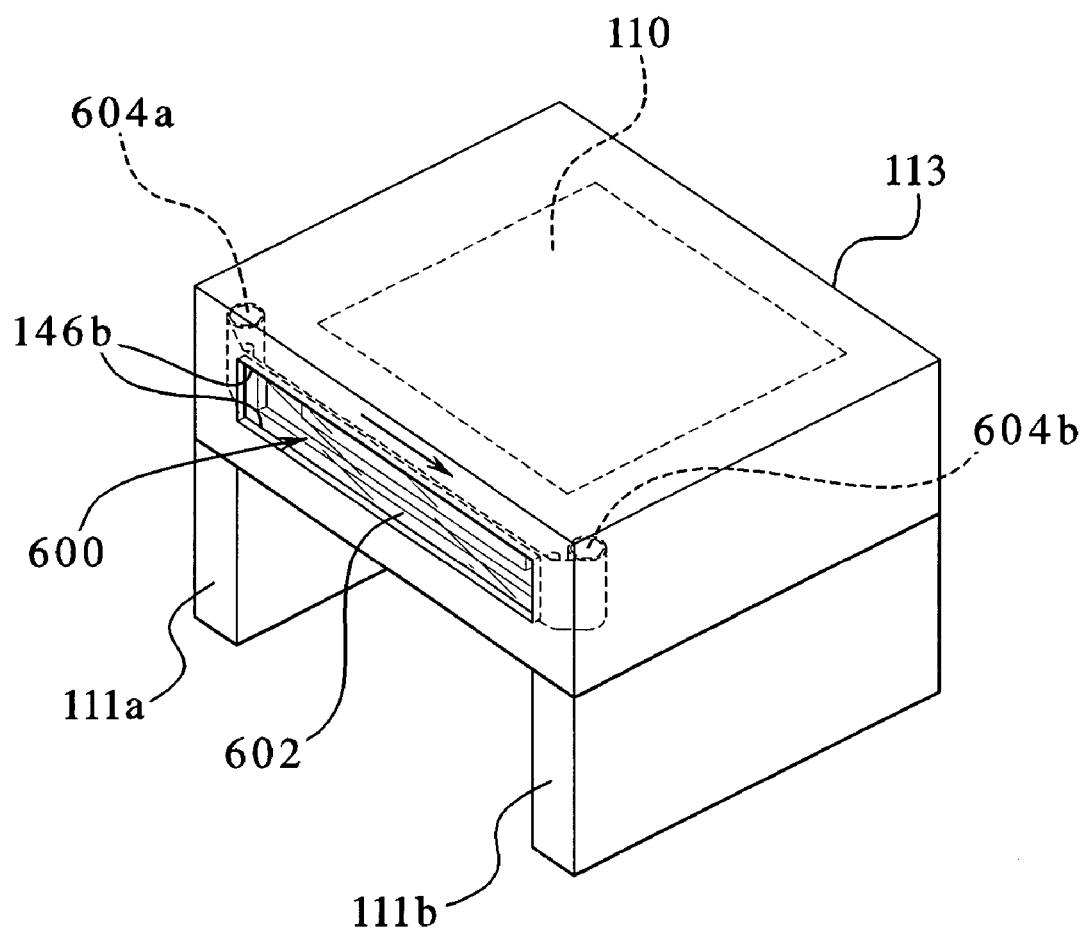
FIG. 23 is a perspective view of the laser generator of FIG. 1 showing a transparent film device connected to the front of the housing of the laser generator.

Referring now to FIG. 23, another embodiment of the present invention is shown where the laser generator and the laser receiver each include a protective device such as a transparent film protective device 600, which minimizes the amount of excess coating that builds up on the front surfaces of the laser generator and laser receiver housings. In FIG. 23, the attachment and operation of the transparent film protective device is shown with respect to the laser generator housing 113. It should be appreciated however, that the attachment and function of the device is identical for the laser receiver housing. The transparent film protective device 600 includes a protective material provider or film provider such as first roller 604a and a protective material receiver or film receiver such as second roller 604b positioned adjacent to the front surface of the housing 113 and attached inside the housing in a suitable manner. A protective material such as transparent film 602 or clear plastic film of a suitable width and thickness, is wound about the first roller 604a. Preferably, the film is pre-wound about the first roller and pre-packaged (similar to camera film) to prevent dust or other contaminants from damaging or creating an obstruction on the transparent film. The film 602 is then guided through the channel 146b (which extends along the entire length of the front surface of the housing) and is attached to the second roller 604b. The second roller 604b is rotatably connected to the housing. A suitable actuator such as a motor (not shown) is attached to the second roller and causes the second roller to rotate. The motor is in communication with the processor and may be programmed to move or index the transparent film from the first roller to the second roller in predetermined intervals. The transparent film 602 provides a clear protective cover for the laser generator and the laser receiver to prevent excess coating from accumulating on the front surfaces of the housings and obstructing the laser generated by the laser generator. The transparent film may be changed or replaced as needed. It should be appreciated that the protective material may be any suitable protective material or transparent film. It should be appreciated that other mechanisms may be employed in accordance with the present invention to provide a transparent protective material for the laser generator and the laser receiver.

In another embodiment, the part measurer of the present invention is employed in a powder coating process or powder spray process which enables an operator to accurately measure and control the application of a coating or coatings to a section of a part. In the powder spray process, very fine particles are applied to the section of the part being coated. In one embodiment, a charge such as a positive charge is generated in the entire part or the section of the part being coated using electricity from a conventional electrical outlet or other suitable electrical source. The charge of the part or the section of the part is opposite to the charge of the powder coating. The oppositely charged part or part surface attracts the fine particles of the powder coating to the part. The resultant coated part includes an even and uniform coating, which strongly adheres to the surface of the part. In one embodiment, the powder coated part is cured in a convection oven, an infrared oven or any other suitable curing device or curing process, which shrinks the powder coating onto the part being coated or the section of the part being coated. In one embodiment, a single powder coating layer is applied to the part or the section of the part being coated using the powder coating system or process described above. In another embodiment, two powder coating layers are applied to the part or the section of the part being coated. In this embodiment, a first powder coating layer is applied to the part as described above and then a second powder coating layer is applied to the first powder coating layer on the part in the same manner. It should be appreciated that any suitable number of powder coating layers may be applied to the part or the section of the part being coated. In a further embodiment, a liquid coating layer such as a primer coating is applied to the part initially and then the powder coating is applied to the primer coating on the part. The powder coating adheres to the liquid coating or primer coating to produce the final coated part. In another embodiment, one or more topcoats or final coating layers are applied to the powder coating on the section of the part being coated. It should be appreciated that the part measurer of the present invention may be employed in a coating system that applies powder coatings, liquid coatings or any suitable combination of powder coatings and liquid coatings to a part or section of a part.

In another embodiment, the part measurer of the present invention is employed in an electrostatic powder spray system or process which uses an electrostatic spray gun to apply a powder coating to a part or a section of the part being coated as described above. In this embodiment, a bonding material, bonding coating or primer and then a conductive material or conductive coating is applied to the section of the part being coated. The powder or powder coating includes a charge such as a positive charge and the conductive material includes an opposite charge such as a negative charge. The conductive coating attracts the oppositely charged powder coating to the conductive material or coating on the part or the section of the part. In one embodiment, the coated part is cured in a convection oven, an infrared oven or any other suitable curing device or curing process, which evaporates the conductive coating and enables the powder coating to shrink onto the part being coated or the section of the part being coated. It should be appreciated that the electrostatic spray system or process may use one or more electrostatic spray guns to apply the coatings to the part or the section of the part being coated. In the above embodiments, the part measurer of the present invention enables the powder coating systems to coat parts or sections of parts with greater accuracy and precision.

In a further embodiment, a coating system includes a plurality of coating stations, wherein each station includes at least one part measurer and at least one sprayer or coating applicator. For example, one or more stations may include the part measurer and sprayer configuration shown in FIG. 2A or the part measurer and sprayer shown in FIG. 17A. In one embodiment, a suitable processor such as a computer having a monitor 130 is used to communicate with the part measurers and sprayers at each station. In another embodiment, a computer and monitor are located at each station and communicate and control the operation of the part measurer or part measurers and the sprayer or sprayers at each station. The stations are preferably connected by conveyors or other suitable part transportation devices. In this embodiment, a part or a section of a part is coated at one or more of the stations while being measured at one or more of the stations. For example, a part including multiple coatings may be coated and measured at one station or at several of the stations. The conveyors transport the part to be coated to and from each of the stations. It should be appreciated that each station may include a sprayer or sprayers that apply a liquid coating, a powder coating, a plurality of liquid coatings, a plurality of powder coatings or any suitable combination of liquid and powder coatings to the part or section of the part being coated. In one embodiment, one or more of the stations include a curing oven, infrared oven or other suitable curing device or process, which cures one or more of the coatings applied to the part.

It should be appreciated that the part measurer may include a laser generator, a laser receiver, a digital camera, a plurality of digital cameras or any suitable combination of these components. It should also be appreciated that the present invention may be used to measure the dimension or dimensions of a section of a part including an angled surface, a beveled surface, a tapered surface, a convex surface, a concave surface or any other uniform or non-uniform surface of a part.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method for applying a coating to a section of a part, said method comprising:
   (a) placing the part on a part support;
   (b) initially measuring at least one first dimension of the section of the part to be coated along a first plane using a laser generator and laser receiver;
   (c) initially measuring at least one second different dimension of the section of the part along a second different plane using a digital camera;
   (d) calculating an initial amount of coating to be applied to the section of the part based on said initial measurement of said first dimension, said initial measurement of said second dimension, and a desired final dimension of the section of the part;
   (e) applying the initial amount of coating to the part while;
      (i) continuing to measure the first dimension of the section of the part being coated using said laser generator and laser receiver, and
      (ii) continuing to measure the second dimension of the section of the part being coated using said digital camera;
   (f) calculating a final amount of coating to be applied to the section of the part based on said continued measurements of said first dimension, said continued measurement of said second dimension, and the desired final dimension of the section of the part;
   (g) applying the final amount of coating to the section of the part while;
      (i) continuing to measure the first dimension of the section of the part being coated using the laser generator and laser receiver, and
      (ii) continuing to measure the second dimension of the section of the part being coated using said digital camera; and
   (h) removing the part from the part support.

2. The method of claim 1, wherein measuring the part includes taking sequential digital pictures of the part.

3. The method of claim 1, which includes taking digital pictures of the section of the part using a plurality of digital cameras, and which includes taking at least two different digital pictures of the section of the part being coated using the digital cameras.

4. The method of claim 1, which includes taking digital pictures of the section of the part using a plurality of digital cameras, and which includes taking at least one digital picture of each of said first plane and said second different planes of the part being coated using the digital cameras.

5. The method of claim 1, which includes prompting a user if a defect or irregularity is detected on the part being coated.

6. The method of claim 1, wherein measuring the section of the part includes projecting at least a portion of a laser beam from the laser generator on opposing sides of the section of the part being coated.

7. The method of claim 1, wherein measuring the section of the part includes horizontally projecting a laser beam from the laser generator at a level of the section of the part being coated.

8. The method of claim 1, wherein measuring the section of the part includes projecting a laser beam from the laser generator along one of said first plane and said second different planes of the section of the part being coated.

9. The method of claim 1, wherein measuring the section of the part includes projecting a laser beam from the laser generator along one of said first plane and said second different planes of the section of the part being coated and wherein the dimension of the laser beam is greater than a diameter of the section of the part being coated.

10. The method of claim 1, which includes displaying the measurements of the section of the part on a display device.

11. The method of claim 1, which includes prompting a user if at least one of the measurements of the section of the part being coated is not within a predetermined range of acceptable dimensions for the part.

12. The method of claim 1, which includes communicating the measurements taken by the part measurer to a processor.

13. The method of claim 1, wherein the coating includes a powder coating applied to the section of the part using at least one powder coating sprayer.

14. The method of claim 1, wherein applying the coating to the section of the part includes electrostatically applying the coating to the section of the part.

15. The method of claim 1, wherein the coating applied to the section of the part includes at least one of the coatings selected from the group consisting of: a liquid coating, a powder coating, a primer coating and a topcoat.

16. A method for applying a coating to a section of a part, said method comprising:
   (a) placing the part on a part support;
   (b) applying an amount of coating to the section of the part until a dimensional measurement of the section of the part taken by a part measurer including a laser generator, laser receiver and a digital camera is within a range of acceptable final dimensions for the section of the part, said amount of coating calculated before and while the part is being coated by:
      (i) measuring at least one first dimension of the section of the part along a first plane using the digital camera,
      (ii) measuring at least one second dimension of the section of the part along a second different plane using the laser generator and laser receiver, and
      (iii) comparing the first measured dimension and the second measured dimension to a desired final dimension of the section of the part;
   (c) comparing at least one digital picture taken by the digital camera with a desired final picture of the coated part;
   (d) detecting any defects on the surface of the part being coated while the part is being coated;
   (e) discarding the part if a defect is detected on the surface of the part; and
   (f) removing the part from the part support when the section of the coated part is within the range of acceptable final dimensions for the section of the part and no defects were detected on the part.

17. The method of claim 16, wherein comparing the digital picture to a desired final picture of the part includes comparing each pixel of the pictures.

18. The method of claim 16, which includes displaying the measurements of the section of the part on a display device.

19. The method of claim 16, which includes prompting a user if at least one of the measurements of the section of the part being coated is not within the range of acceptable dimensions for the section of the part.

20. The method of claim 16, which includes moving the digital camera to take at least one digital picture of the section of the part being coated.

21. A method for applying a coating to a section of a part, said method comprising:
   (a) placing the part on a part support;
   (b) initially measuring at least one first dimension of the section of the part to be coated along a first planes using laser generators and a laser receiver;

(c) initially measuring at least one second dimension of the section of the part to be coated along a second different plane using a digital camera;

(d) calculating an initial amount of coating to be applied to the section of the part based on said initial measurements of said first dimension, said initial measurement of said second dimension, and a desired final dimension of the section of the part;

(e) applying the initial amount of coating to the part;

(f) after the initial amount of coating is applied to the section of the part:
   (i) further measuring the first dimension of the section of the part being coated using the laser generator and the laser receiver,
   (ii) further measuring the second dimension of the section of the part being coated using the digital camera, and
   (iii) calculating a final amount of coating to be applied to the section of the part based on said further measurements of the first dimension, further measurement of the second dimension, and the desired final dimension of the section of the part;

(g) applying the final amount of coating to the section of the part; and (h) removing the part from the part support.

22. The method of claim 21, which includes prompting a user if a defect or irregularity is detected on the part before being coated.

23. The method of claim 21, which includes displaying the measurements of the section of the part on a display device.

24. The method of claim 21, which includes prompting a user if at least one of the measurements of the section of the part being coated is not within a predetermined range of acceptable dimensions for the part.

25. The method of claim 21, wherein the coating includes a powder coating applied to the section of the part using at least one powder coating sprayer.

26. The method of claim 21, wherein applying the coating to the section of the part includes electrostatically applying the coating to the section of the part.

27. The method of claim 21, wherein the coating applied to the section of the part includes at least one of the coatings selected from the group consisting of: a liquid coating, a powder coating, a primer coating and a topcoat.

* * * * *